(12) United States Patent
Stagner et al.

(10) Patent No.: US 12,551,433 B1
(45) Date of Patent: Feb. 17, 2026

(54) ASSOCIATED FORMS OF NONSTEROIDAL ANTI-INFLAMMATORY DRUGS AND LOCAL ANESTHETICS

(71) Applicants: William C. Stagner, Apex, NC (US); Ninad Deshpanday, Cary, NC (US); John R. Cardinal, Wilmington, NC (US); David M. Oakley, Todd, NC (US)

(72) Inventors: William C. Stagner, Apex, NC (US); Ninad Deshpanday, Cary, NC (US); John R. Cardinal, Wilmington, NC (US); David M. Oakley, Todd, NC (US)

(73) Assignee: Innovator Therapeutics, LLC, Albemarle, NC (US)

( * ) Notice: Subject to any disclaimer, the term of this patent is extended or adjusted under 35 U.S.C. 154(b) by 0 days.

(21) Appl. No.: 19/222,659

(22) Filed: May 29, 2025

(51) Int. Cl.
| | |
|---|---|
| *A61K 9/00* | (2006.01) |
| *A61K 9/08* | (2006.01) |
| *A61K 31/167* | (2006.01) |
| *A61K 31/192* | (2006.01) |
| *A61K 47/10* | (2017.01) |
| *A61K 47/16* | (2006.01) |

(52) U.S. Cl.
CPC ............. *A61K 9/0014* (2013.01); *A61K 9/08* (2013.01); *A61K 31/167* (2013.01); *A61K 31/192* (2013.01); *A61K 47/10* (2013.01); *A61K 47/16* (2013.01)

(58) Field of Classification Search
CPC ...... A61K 9/0014; A61K 9/08; A61K 31/167; A61K 31/192; A61P 29/00
See application file for complete search history.

(56) References Cited

U.S. PATENT DOCUMENTS

2007/0269393 A1* 11/2007 Wepfer .................. A61P 23/02
   514/35
2016/0279245 A1* 9/2016 Hull ...................... A61K 31/573

OTHER PUBLICATIONS

Yurtlu S (The Journal of International Medical Research, 2011, vol. 39, pp. 1923-1931) (Year: 2011).*
Masic et al (Pharmacotherapy, 2018, vol. 38, pp. 1250-1259) (Year: 2018).*
PCCA (PCCA blog, 2 Tips for compounding with lidocaine and lidocaine HCI, by Melissa Rhoads, Mar. 30, 2022, https://www.pccarx.com/Blog/2-tips-for-compounding-with-lidocaine-and-lidocaine-hcl) (Year: 2022).*

* cited by examiner

*Primary Examiner* — Mark V Stevens
(74) *Attorney, Agent, or Firm* — Innovator Therapeutics, LLC

(57) ABSTRACT

The present disclosure provides novel associated form (AF) of ketoprofen/dexketoprofen and lidocaine, and topical compositions thereof for use in topical products to treat patients with localized pain and inflammation. The novel ketoprofen/dexketoprofen and lidocaine AF acts as an extended-release drug delivery system due to extended release of the two drugs from the AF.

26 Claims, 15 Drawing Sheets

ASSOCIATED FORMS OF NONSTEROIDAL ANTI-INFLAMMATORY DRUGS AND LOCAL ANESTHETICS

TECHNICAL FIELD

The presently disclosed subject matter relates to novel pharmaceutically acceptable associated forms (AF) of non-steroidal anti-inflammatory drugs (NSAIDs) and local anesthetics, e.g., NSAID-local anesthetic AF, and formulations thereof for use in topical products to treat patients with localized pain and inflammation. In particular, the invention relates to AFs of ketoprofen or dexketoprofen (ketoprofen/dexketoprofen) with lidocaine (NSAID-local anesthetic AF), generally isolated as viscous liquids, or formed in situ, and formulations thereof. In certain embodiments, the ketoprofen/dexketoprofen and lidocaine association (ketoprofen/dexketoprofen-lidocaine AF) acts as an extended-release drug delivery system due to extended release of the two drugs from the AF. In certain embodiments, the formulations comprising ketoprofen/dexketoprofen-lidocaine AF provide synergistic action in treatment of pain and inflammation via the AF acting as an extended release drug delivery system to provide long-lasting therapeutic effect and improving patient compliance.

The NSAID and local anesthetics are intentionally chosen to create NSAID-local anesthetic AF to treat pain by two different mechanisms of action. The AF is structurally and physically distinct from the NSAID (free acid or salt thereof) and local anesthetic (free base or salt thereof).

BACKGROUND

Oral non-steroidal anti-inflammatory drugs (NSAIDs) and topical anesthetics are often prescribed together in management of pain and discomfort. Local anesthetics reversibly block the impulse conduction along nerves and other excitable membranes that primarily utilize sodium channels. Clinically, this action blocks the pain sensation from specific areas of the body. Non-steroidal anti-inflammatory drugs (NSAIDs) are widely used as anti-inflammatories, analgesics, antipyretics, and anti-thrombotics to treat a variety of clinical conditions manifesting symptoms of pain, inflammation, and fever. Among the NSAIDs, ketoprofen and dexketoprofen are known for their role as anti-rheumatic agents for treatment of rheumatoid arthritis and osteoarthritis. Ketoprofen is a racemic mixture comprising 2-(3-benzoylphenyl) propanoic acid. Dexketoprofen is the dextrorotatory enantiomer of ketoprofen, i.e., ((2S)-2-(3-benzoylphenyl) propanoic acid). Ketoprofen has anti-inflammatory, analgesic, and antipyretic properties. Racemic ketoprofen is a very potent inhibitor of prostaglandin synthesis. The effect is due to the S-(+)-enantiomer (dexketoprofen), while the R-(−)-enantiomer lacks such activity. Notwithstanding their high efficacy, oral administration of many NSAIDs can cause serious adverse effects such as gastrointestinal bleeding and ulceration, liver and kidney damage, and central nervous system and cutaneous disturbances, particularly after extended use. In order to minimize adverse effects associated with oral administration, non-oral delivery of NSAIDs has been extensively investigated in recent years.

Topical delivery is an attractive option to avoid hepatic first-pass metabolism, reduce side effects associated with oral administration, improve patient compliance and, in some cases, enhance therapeutic efficacy of the drug, especially at local sites of action.

Topical delivery of NSAIDs is particularly useful for treatment of arthritis, e.g., rheumatoid arthritis, osteoarthritis, and related conditions characterized by painful and swollen joints due to inflammation in the musculoskeletal tissues of the joints. Well-established prescription NSAIDs have been approved for the treatment of arthritic inflammation and pains, and e.g., as topical treatments for knee and elbow, and other joint inflammation and pain. They are also used to treat acute pain caused by minor strains, sprains, bruises. There are many challenges in topical drug delivery. The topical composition should deliver the active agent to the site of treatment, have desirable sensory characteristics, not leave an unpleasant residue on the surface of the skin, and not cause irritation or discomfort. Although topical administration of certain NSAIDs, e.g., naproxen, ketoprofen, dexketoprofen, diclofenac, piroxicam and ibuprofen, has been shown to deliver the drug to the local musculoskeletal tissues of joints where arthritic conditions often develop, the effectiveness of topical administration of NSAIDs is limited by the inability of these drugs to readily permeate the skin. Diclofenac solution is one of the FDA approved and marketed topical NSAID product containing diclofenac sodium. The solution base contains dimethyl sulfoxide (DMSO) to enhance permeation and absorption of diclofenac through the skin. However, such solution compositions are greasy, runny and slow to dry, may dry the skin and are often irritating. They also require frequent dosing of three to four times daily to achieve efficacy in osteoarthritis, which increases exposure to potential skin irritants and increases the risk of skin irritation. The act of disrupting the skin barrier using permeation enhancers causes skin irritation. With increased disruption, skin irritation becomes a greater issue. This is particularly problematic with topical osteoarthritic treatments where the goal is to have the active penetrate joint tissue and where the drug must be utilized on a repeated, long-term basis due to the nature of the disease.

In conventional topical formulations of NSAIDs that are commercially available or dispensed by compounding pharmacies, the active ingredients or salts or esters are simply dissolved, dispersed or otherwise formulated in a suitable pharmaceutical vehicle. The thermodynamic activity of the drug in such formulations is relatively low due to the limited solubility of drugs in the vehicle. In recent years, improvement of the dermal permeation of NSAIDs has been introduced, which includes the increase of lipophilicity of the drug, incorporation of the drug into lipid vesicles such as liposomes, and the employment of one or more permeation enhancers in the formulation. However, the results of these approaches are largely unsatisfactory.

Local anesthetics are weak bases and generally consist of a lipophilic group (frequently an aromatic ring) connected by an intermediate chain (commonly including an ester or amide) to an ionizable group (usually a tertiary amine). Optimal activity requires a delicate balance between the lipophilic and hydrophilic strengths of these groups. Since ester links (as in procaine) are more prone to hydrolysis than amide links, esters usually have a shorter duration of action.

Among local anesthetics, lidocaine, 2-(diethylamino)-N-(2,6-dimethylphenyl)-acetamide, is particularly known for its treatment of ventricular tachycardia (an arrythmia of the heart) as an intravenous injection solution. (U.S. Pat. No. 3,968,205). In addition, lidocaine is known for its therapeutic effects in reducing post-herpetic neuralgia (PHN) nerve injury pain from shingles (herpes zoster and post herpetic neuralgia) and analogous neuropathies. U.S. Pat. No. RE37,727 discloses methods employing lidocaine intradermal administration by transporting lidocaine from the skin surface, using patches and dressings, into the skin.

US 2005/256187 relates to a method and composition for synergistic topical therapy of the symptoms of neuromuscular pains. In this method, for intact skin or open skin, the use of a suitable topical pharmaceutical formulation is described. This formulation is loaded with a suitable concentration of a sodium channel blocker from the class of local anesthetics of the ester or amide type and a substance from the class of non-steroidal anti-inflammatory drugs, whose selective release takes place onto or under the skin region. By the simultaneous inhibition of the inflammatory pain factors at the cellular level and. also of the transmission of neuronal pain impulses in response thereto, this therapy achieves pharmacologically more effective alleviation of neuromuscular pain.

Local anesthetics are usually administered by injection into the area of the nerve fibers to be blocked. Thus, absorption and distribution are not as important in controlling the onset of effect as in determining the rate of offset of anesthesia and the likelihood of central nervous system and cardiac toxicity. Lidocaine is a well-established local anesthetic that is currently available as an over-the-counter (OTC) transdermal patch for the treatment of back pain. It is also available as a cream, ointment, and topical spray (all OTC) to treat localized itching and pain. Topical application of local anesthetics, however, requires drug diffusion for both onset and offset of anesthetic effect. Therefore, the solubility and stability of the drug become major factors in determining the therapeutic effects of the drug.

U.S. Pat. No. 6,368,618 discloses topical formulations for delivery of NSAIDs using a two-phase liquid composition containing aqueous and oil phases. The compositions include local anesthetic as a melting point depressing agent in an amount of less than about ¼ of the weight of the NSAID.

U.S. Pat. No. 9,278,134 discloses bioactive co-ionic liquid compositions comprising an NSAID as anion and a local anesthetic as cation. Such combination of drugs in ionic forms provide an ionic liquid that can result in the modification and/or enhancement of the drug's properties.

U.S. Pat. No. 9,731,026 discloses non-aqueous liquid pharmaceutical formulations comprising a low temperature transition mixture (LTTM)/Deep eutectic solvent (DES) of an NSAID (hydrogen bond donor) and a local anesthetic (hydrogen bond acceptor). Such compositions involve non-covalent ionic interactions between positively charged ions from hydrogen bond acceptors and negatively charged ions from hydrogen bond donors. The patent interchangeably uses the terms "deep-eutectic solvent" ("DES") and "low-transition-temperature mixture" ("LTTM") to describe liquid compositions having at least two components which interact with each other via noncovalent bonds to form a low-transition-temperature mixture (or deep-eutectic solvent), thereby confirming that LTTM involves noncovalent ionic interactions between a hydrogen bond donor and hydrogen bond acceptor.

U.S. Pat. No. 6,841,161 discloses topical emulsion compositions comprising at least one discontinuous phase in a continuous phase. The discontinuous phase comprises a eutectic mixture of first and second pharmaceutically acceptable components which are both pharmacologically active agents and the continuous phase comprises a pharmaceutically acceptable carrier. The eutectic mixture has a melting point below 40° C. The first pharmaceutically active agent can be a local anesthetic and the second active pharmaceutical agent can be an NSAID, for e.g., ibuprofen, or ketoprofen.

EP 1 405 646 discloses a salt (I) of a local anesthetic (preferably Lidocaine) with an anti-inflammatory compound (II) (preferably Diclofenac).

Research paper entitled "Lidocaine as Eutectic Forming Drug for Enhanced Transdermal Delivery of Non-Steroidal Anti-Inflammatory Drugs," Hadir et al., Journal of Drug Delivery Science and Technology, 61(2021), discloses and characterizes lidocaine-NSAID eutectic mixture.

There is an unmet need of topical compositions comprising an NSAID and a local anesthetic, e.g., ketoprofen/dexketoprofen and lidocaine, designed to deliver the two drugs through the skin in an enhanced and sustained manner, providing a long-lasting therapeutic effect in the treatment of localized pain and inflammation at a lower dose than other routes of drug administration. This novel product can also be useful in treating systemic pain and inflammation.

It is an object of this invention to provide novel topical compositions for the local treatment or prevention of pain and inflammation. It would be desirable to achieve rapid, improved, and prolonged relief as well as other benefits to the patient in terms of patient compliance, tolerability, and the like.

SUMMARY

In one embodiment, the disclosure provides an extended release dexketoprofen-lidocaine associated form comprising a dexketoprofen component and a lidocaine component;
- wherein the dexketoprofen component is dexketoprofen free acid and the lidocaine component is lidocaine free base;
- wherein the dexketoprofen component and the lidocaine component are present in 1:1 wt ratio;
- wherein the associated form does not include a covalent bond or an ionic bond between dexketoprofen free acid and lidocaine free base; and
- wherein the associated form when subjected to characterization using infrared spectrum (IR) is missing IR peak at 1729 $cm^{-1}$ and is missing a broad IR peak between 2000-2800 $cm,^{-1}$ wherein the IR peak at 1729 $cm^{-1}$ represents —C=O stretching vibration of acid group in dexketoprofen, and the broad peak between 2000-2800 $cm^{-1}$ represent peaks associated with salt formation between dexketoprofen free acid and lidocaine free base.

The dexketoprofen-lidocaine associated form does not include any extended release excipient.

The dexketoprofen free acid includes dexketoprofen in free acid form and does not include dexketoprofen salt; and the lidocaine free base includes lidocaine in free base form and does not include lidocaine salt.

The associated form has different physical characteristics as compared to dexketoprofen free acid or a salt thereof and lidocaine free base or a salt thereof. The physical characteristics include physical appearance, density, viscosity, specific gravity, color, and clarity.

The associated form is formed due to association of acid group of dexketoprofen free acid and amide group of lidocaine free base.

The associated form is prepared by triturating or grinding a mixture of dexketoprofen free acid and lidocaine free base using pestle and mortar.

In certain embodiments, the dexketoprofen-lidocaine associated form is prepared by melting a mixture of dexketoprofen free acid and lidocaine free base into a melt and cooling the mixture into a viscous liquid.

In certain embodiments, the dexketoprofen-lidocaine associated form is obtained after dissolving dexketoprofen free acid and lidocaine free base in acetone to obtain a solution, followed by evaporating the acetone from the solution.

In certain embodiments, the dexketoprofen-lidocaine associated form is prepared in situ by dissolving dexketoprofen free acid and lidocaine free base in a solvent. The solvent is selected from the group consisting of methanol, ethanol, isopropyl alcohol, acetone, acetonitrile, dichloromethane, and mixtures thereof. In certain embodiments, the associated form on administration as a topical composition to a subject exhibits flip-flop pharmacokinetics, with zero-order absorption and first-order elimination for dexketoprofen and lidocaine.

The associated form on administration as a topical composition to a subject exhibits a slow absorption of dexketoprofen and lidocaine.

The associated form on administration as a topical composition provides a mean Tmax for dexketoprofen from about 17 to about 37 hours and a mean Tmax of lidocaine of from about 16 to about 26 hours.

The AF on administration as a topical composition provides prolonged plasma levels of dexketoprofen up to about 96 hours and lidocaine up to about 72 hours.

In a separate embodiment, the disclosure provides a pharmaceutical solution composition suitable for topical administration comprising a dexketoprofen-lidocaine associated form; and a vehicle selected from the group consisting of a monovalent alcohol, a divalent alcohol, a trivalent alcohol, dimethyl sulfoxide, triacetin, propylene carbonate, and mixtures thereof;
  wherein the associated form contains dexketoprofen free acid and lidocaine free base in 1:1 weight ratio;
  wherein the associated form does not include a covalent bond or an ionic bond between dexketoprofen free acid and lidocaine free base;
  wherein the associated form when subjected to characterization using infrared spectrum (IR) is missing IR peak at 1729 cm$^{-1}$ and is missing a broad IR peak between 2000-2800 cm$^{-1}$ wherein the IR peak at 1729 cm$^{-1}$ represents —C═O stretching vibration of acid group in dexketoprofen and the broad peak between 2000-2800 cm$^{-1}$ represent peaks associated with salt formation between dexketoprofen free acid and lidocaine free base; and
  wherein the composition on topical administration to a subject provides extended release of the dexketoprofen and lidocaine.

The vehicle is a monovalent alcohol, a divalent alcohol, a trivalent alcohol, or mixtures thereof. The monovalent alcohol is selected from the group consisting of ethanol, propanol, isopropanol, decyl alcohol, and mixtures thereof. The divalent alcohol is selected from the group consisting of propylene glycol, butylene glycol, dipropylene glycol, hexylene glycol, polyethylene glycol and mixtures thereof.

The dexketoprofen free acid includes dexketoprofen in free acid form and does not include dexketoprofen salt; and the lidocaine free base includes lidocaine in free base form and does not include lidocaine salt.

In certain embodiments, the solution is dispensed as a topical spray, roll-on, drops, foam, or gel or transdermal patch.

In certain embodiments, the localized pain and/or inflammation is associated with osteoarthritis, rheumatoid arthritis, and related conditions characterized by painful and swollen joints.

In certain embodiments, the solution composition further comprises lidocaine free base in addition to dexketoprofen-lidocaine associated form. In certain embodiments, the dexketoprofen-lidocaine associated form provides extended release of dexketoprofen and lidocaine; and lidocaine free base provides immediate release of lidocaine.

In still another embodiment, the disclosure provides a method for making a topical pharmaceutical composition comprising dexketoprofen-lidocaine associated form, the method comprising dissolving dexketoprofen free acid and lidocaine free base in a vehicle selected from the group consisting of a monovalent alcohol, a divalent alcohol, a trivalent alcohol, or mixtures thereof;
  wherein the dexketoprofen free acid and the lidocaine free base are present in a weight ratio of from about 1:1 to about 1:5;
  wherein the associated form does not include a covalent bond or an ionic bond between dexketoprofen free acid and lidocaine free base.
  wherein the excess lidocaine present in the composition (in excess of 1:1 ratio) is present as free or unassociated lidocaine free base; and
  wherein the associated form when subjected to characterization using infrared spectrum (IR) is missing IR peak at 1729 cm$^{-1}$ and is missing a broad IR peak between 2000-2800 cm$^{-1}$ wherein the IR peak at 1729 cm$^{-1}$ represents —C═O stretching vibration of acid group in dexketoprofen and the broad peak between 2000-2800 cm$^{-1}$ represent peaks associated with salt formation between dexketoprofen free acid and lidocaine free base.

The composition on topical administration to a subject exhibits flip-flop pharmacokinetics of dexketoprofen and lidocaine with zero order absorption and first order elimination of the two drugs, thereby resulting in an extended drug delivery and providing a mean Tmax for dexketoprofen from about 17 to about 37 hours and lidocaine of from about 16 to about 26 hours.

The dexketoprofen free acid includes dexketoprofen in free acid form and does not include dexketoprofen salt; and the lidocaine free base includes lidocaine in free base form and does not include lidocaine salt.

The associated form contains equimolar amounts of the dexketoprofen free acid and the lidocaine free base. In certain embodiments, the associated form comprises the dexketoprofen free acid and the lidocaine free base in a weight ratio of about 1:1.

The monovalent alcohol is selected from the group consisting of ethanol, propanol, isopropanol, decyl alcohol, and mixtures thereof. The divalent alcohol is selected from the group consisting of propylene glycol, butylene glycol, dipropylene glycol, hexylene glycol, polyethylene glycol and mixtures thereof. The trivalent alcohol is selected from the group consisting of glycerin, hexanetriol, and mixtures thereof.

In certain embodiments, the vehicle is a monovalent alcohol selected from the group consisting of ethanol, propanol, isopropanol, and mixtures thereof.

In certain embodiments, the method comprises dissolving 1:1 molar ratio of dexketoprofen free acid and lidocaine free base in a vehicle. In certain embodiments, the method comprises dissolving from about 1:2 to about 1:5 molar ratio of the dexketoprofen free acid and the lidocaine free base.

In still another embodiment, the disclosure provides a method of relieving pain in a subject suffering from osteoarthritis, rheumatoid arthritis, and/or related conditions characterized by painful and swollen joints, and other joint inflammations, the method comprising topical administration of a solution comprising a dexketoprofen-lidocaine associated form; and a vehicle selected from the group consisting of a monovalent alcohol, a divalent alcohol, a trivalent alcohol, dimethyl sulfoxide, triacetin, propylene carbonate, and mixtures thereof;

wherein the associated form contains dexketoprofen free acid and lidocaine free base; wherein the associated form does not include a covalent bond or an ionic bond between the dexketoprofen free acid and the lidocaine free base; and wherein the associated form when subjected to characterization using infrared spectrum (IR) is missing IR peak at 1729 cm$^{-1}$ and is missing a broad IR peak between 2000-2800 cm$^{-1}$ wherein the IR peak at 1729 cm$^{-1}$ represents —C═O stretching vibration of acid group in dexketoprofen and the broad peak between 2000-2800 cm$^{-1}$ represent peaks associated with salt formation between dexketoprofen free acid and lidocaine free base.

The solution on topical administration to the subject exhibits flip-flop pharmacokinetics of dexketoprofen and lidocaine with zero order absorption and first order elimination of the two drugs, thereby resulting in an extended drug delivery and providing a mean Tmax for dexketoprofen from about 17 to about 37 hours, and a mean Tmax for lidocaine of from about 16 to about 26 hours.

In still another embodiment, the disclosure provides method of relieving pain in a subject suffering from musculoskeletal pain, the method comprising topical administration of a solution comprising a dexketoprofen-lidocaine associated form; and a vehicle selected from the group consisting of a monovalent alcohol, a divalent alcohol, a trivalent alcohol, dimethyl sulfoxide, triacetin, propylene carbonate, and mixtures thereof;

wherein the associated form contains dexketoprofen free acid and lidocaine free base; and wherein the associated form does not include a covalent bond or an ionic bond between the dexketoprofen free acid and the lidocaine free base; and wherein the associated form when subjected to characterization using infrared spectrum (IR) is missing IR peak at 1729 cm$^{-1}$ and is missing a broad IR peak between 2000-2800 cm$^{-1}$ wherein the IR peak at 1729 cm$^{-1}$ represents —C═O stretching vibration of acid group in dexketoprofen and the broad peak between 2000-2800 cm$^{-1}$ represent peaks associated with salt formation between dexketoprofen free acid and lidocaine free base.

The solution on topical administration to the subject exhibits flip-flop pharmacokinetics of dexketoprofen and lidocaine with zero order absorption and first order elimination of the two drugs, thereby resulting in an extended drug delivery and providing a mean Tmax for dexketoprofen from about 17 to about 37 hours and a mean Tmax for lidocaine of from about 16 to about 26 hours.

In another embodiment, the disclosure provides a method of relieving pain in a subject suffering from ankylosing spondylitis, the method comprising topical administration of a solution comprising a dexketoprofen-lidocaine associated form; and a vehicle selected from the group consisting of a monovalent alcohol, a divalent alcohol, a trivalent alcohol, dimethyl sulfoxide, triacetin, propylene carbonate, and mixtures thereof;

wherein the associated form contains dexketoprofen free acid and lidocaine free base; and wherein the associated form does not include a covalent bond or an ionic bond between the dexketoprofen free acid and the lidocaine free base; and wherein the associated form when subjected to characterization using infrared spectrum (IR) is missing IR peak at 1729 cm$^{-1}$ and is missing a broad IR peak between 2000-2800 cm$^{-1}$ wherein the IR peak at 1729 cm$^{-1}$ represents —C═O stretching vibration of acid group in dexketoprofen and the broad peak between 2000-2800 cm$^{-1}$ represent peaks associated with salt formation between dexketoprofen free acid and lidocaine free base.

The solution on topical administration to the subject exhibits flip-flop pharmacokinetics of dexketoprofen and lidocaine with zero order absorption and first order elimination of the two drugs, thereby resulting in an extended drug delivery and providing a mean Tmax for dexketoprofen from about 17 to about 37 hours and a mean Tmax for lidocaine of from about 16 to about 26 hours.

In another embodiment, the disclosure provides method of relieving pain in a subject suffering from acute pain caused by minor strains, sprains, and/or bruises, the method comprising topical administration of a solution comprising a dexketoprofen-lidocaine associated form; and a vehicle selected from the group consisting of a monovalent alcohol, a divalent alcohol, a trivalent alcohol, dimethyl sulfoxide, triacetin, propylene carbonate, and mixtures thereof;

wherein the associated form contains dexketoprofen free acid and lidocaine free base; and wherein the associated form does not include a covalent bond or an ionic bond between the dexketoprofen free acid and the lidocaine free base; and wherein the associated form when subjected to characterization using infrared spectrum (IR) is missing IR peak at 1729 cm$^{-1}$ and is missing a broad IR peak between 2000-2800 cm$^{-1}$ wherein the IR peak at 1729 cm$^{-1}$ represents —C═O stretching vibration of acid group in dexketoprofen and the broad peak between 2000-2800 cm$^{-1}$ represent peaks associated with salt formation between dexketoprofen free acid and lidocaine free base.

The solution on topical administration to the subject exhibits flip-flop pharmacokinetics of dexketoprofen and lidocaine with zero order absorption and first order elimination of the two drugs, thereby resulting in an extended drug delivery and providing a mean Tmax for dexketoprofen from about 17 to about 37 hours and a mean Tmax for lidocaine of from about 16 to about 26 hours.

In still another embodiment, the disclosure provides a method of relieving pain in a subject suffering from localized pain, e.g., neurological pain, skeletal-muscle pain, back pain, joint pain, pain associated with herpes infection, pain associated with itching and insect bites, and wound pain, e.g., sunburn pain, hemorrhoids, or pain from an injury, the method comprising topical administration of a solution comprising a dexketoprofen-lidocaine associated form; and a carrier vehicle selected from the group consisting of a monovalent alcohol, a divalent alcohol, a trivalent alcohol, dimethyl sulfoxide, triacetin, propylene carbonate, and mixtures thereof;

wherein the associated form contains dexketoprofen free acid and lidocaine free base; and wherein the associated form does not include a covalent bond or an ionic bond between the dexketoprofen free acid and the lidocaine free base; and wherein the associated form when subjected to characterization using infrared spectrum (IR) is missing IR peak at 1729 cm$^{-1}$ and is missing a broad IR peak between 2000-2800 cm$^{-1}$ wherein the IR peak at 1729 cm$^{-1}$ represents —C═O stretching vibration of acid group in dexketoprofen and the broad peak between 2000-2800 cm$^{-1}$ represent peaks associated with salt formation between dexketoprofen free acid and lidocaine free base.

The solution on topical administration to the subject exhibits flip-flop pharmacokinetics of dexketoprofen and lidocaine with zero order absorption and first order elimination of the two drugs, thereby resulting in an extended drug delivery and providing a mean Tmax for dexketoprofen from about 17 to about 37 hours and a mean Tmax for lidocaine of from about 16 to about 26 hours.

The vehicle is a monovalent alcohol, a divalent alcohol, a trivalent alcohol, or mixtures thereof. The monovalent alcohol is selected from the group consisting of ethanol, propanol, isopropanol, decyl alcohol, and mixtures thereof. The divalent alcohol is selected from the group consisting of propylene glycol, butylene glycol, dipropylene glycol, hexylene glycol, polyethylene glycol, and mixtures thereof. The trivalent alcohol is selected from the group consisting of glycerin, hexanetriol, and mixtures thereof.

The dexketoprofen free acid includes dexketoprofen in free acid form and does not include dexketoprofen salt; and the lidocaine free base includes lidocaine in free base form and does not include lidocaine salt.

The associated form has different physical characteristics as compared to dexketoprofen free acid or a salt thereof and lidocaine free base or a salt thereof. In certain embodiments, the physical characteristics include physical appearance, density, viscosity, specific gravity, and color/clarity.

In certain embodiments, the solution is dispensed as a topical spray, foam, roll-on, drops, or gel or transdermal patch. In certain embodiments, the solution comprises lidocaine free base in addition to dexketoprofen-lidocaine associated form.

DETAILED DESCRIPTION

Figure 1:
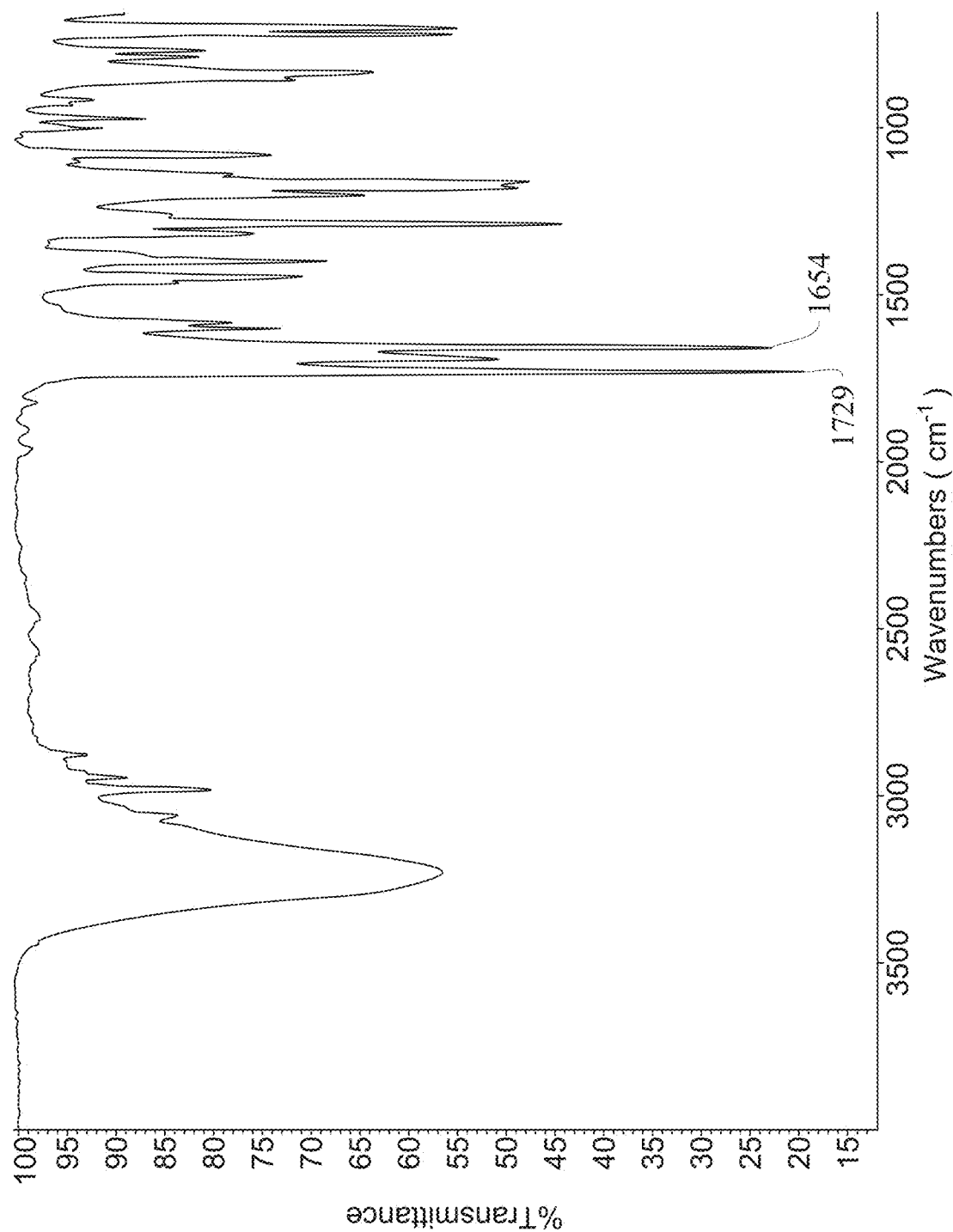
FIG. 1 shows infrared (IR) spectrum of dexketoprofen free acid using Fourier-Transform Infrared spectroscopy (FTIR). There were two peaks identified in the dexketoprofen free acid IR spectrum that were unique to dexketoprofen. The wavelength of these peaks were 1729 cm$^{-1}$ and 1654 cm$^{-1}$. Peak for C═O stretching vibration of acid appeared at 1729 cm$^{-1}$ and peak for C═O stretching vibration for ketone appeared at 1654 cm$^{-1}$.
Figure 2:
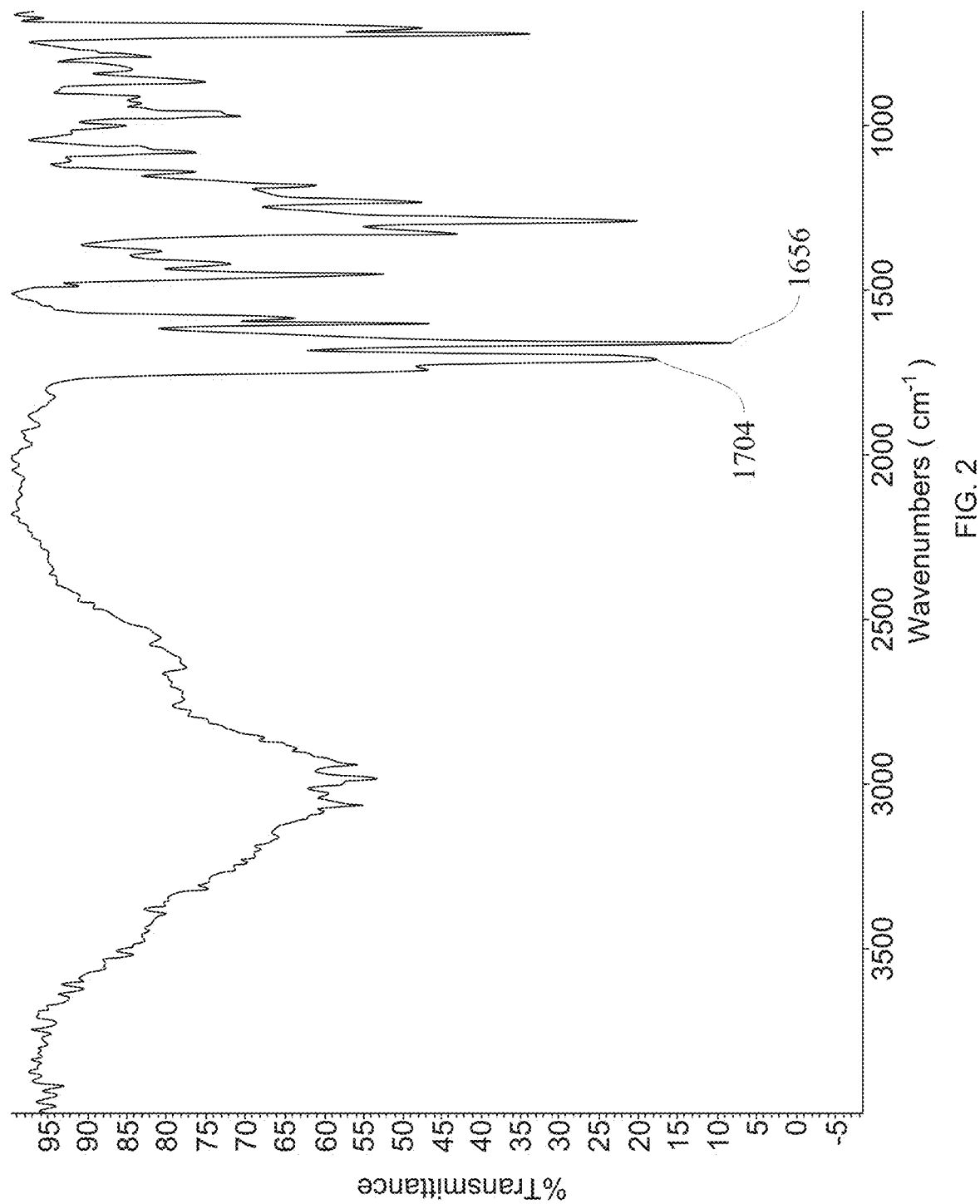
FIG. 2 shows IR spectrum of ketoprofen free acid using FTIR. There were two peaks identified in the ketoprofen free acid IR spectrum that were unique to ketoprofen. The wavelength of these peaks were 1704 cm$^{-1}$ and 1656 cm$^{-1}$. Peak for C═O stretching vibration of acid appeared at 1704 cm$^{-1}$ and peak for C═O stretching vibration for ketone appeared at 1656 cm$^{-1}$.
Figure 3:
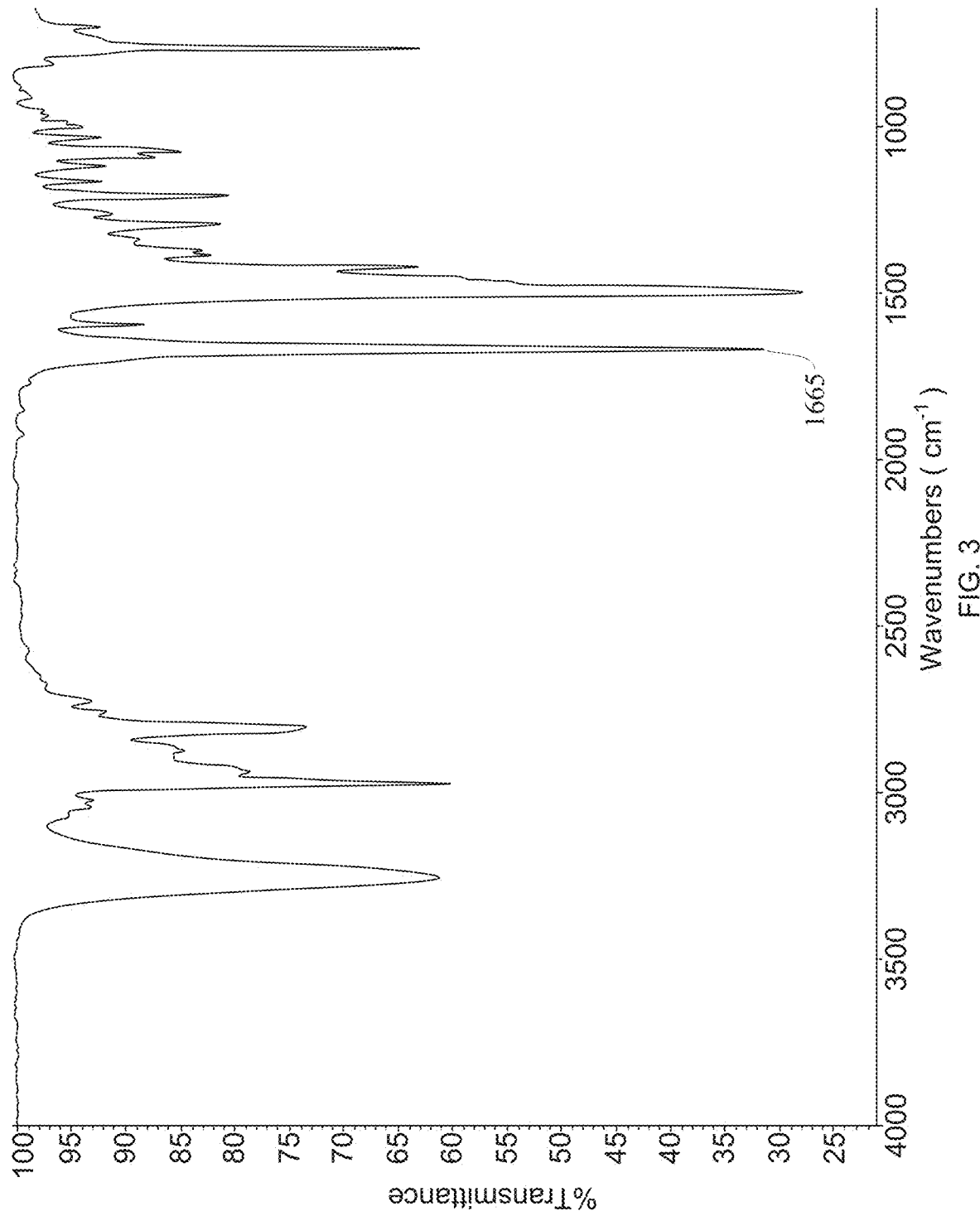
FIG. 3 shows IR spectrum of lidocaine free base using FTIR. There was one peak identified in the lidocaine free base IR spectrum that was unique to lidocaine. The wavelength of this peak was 1665 cm$^{-1}$ for C═O stretching vibration of amide.
Figure 4:
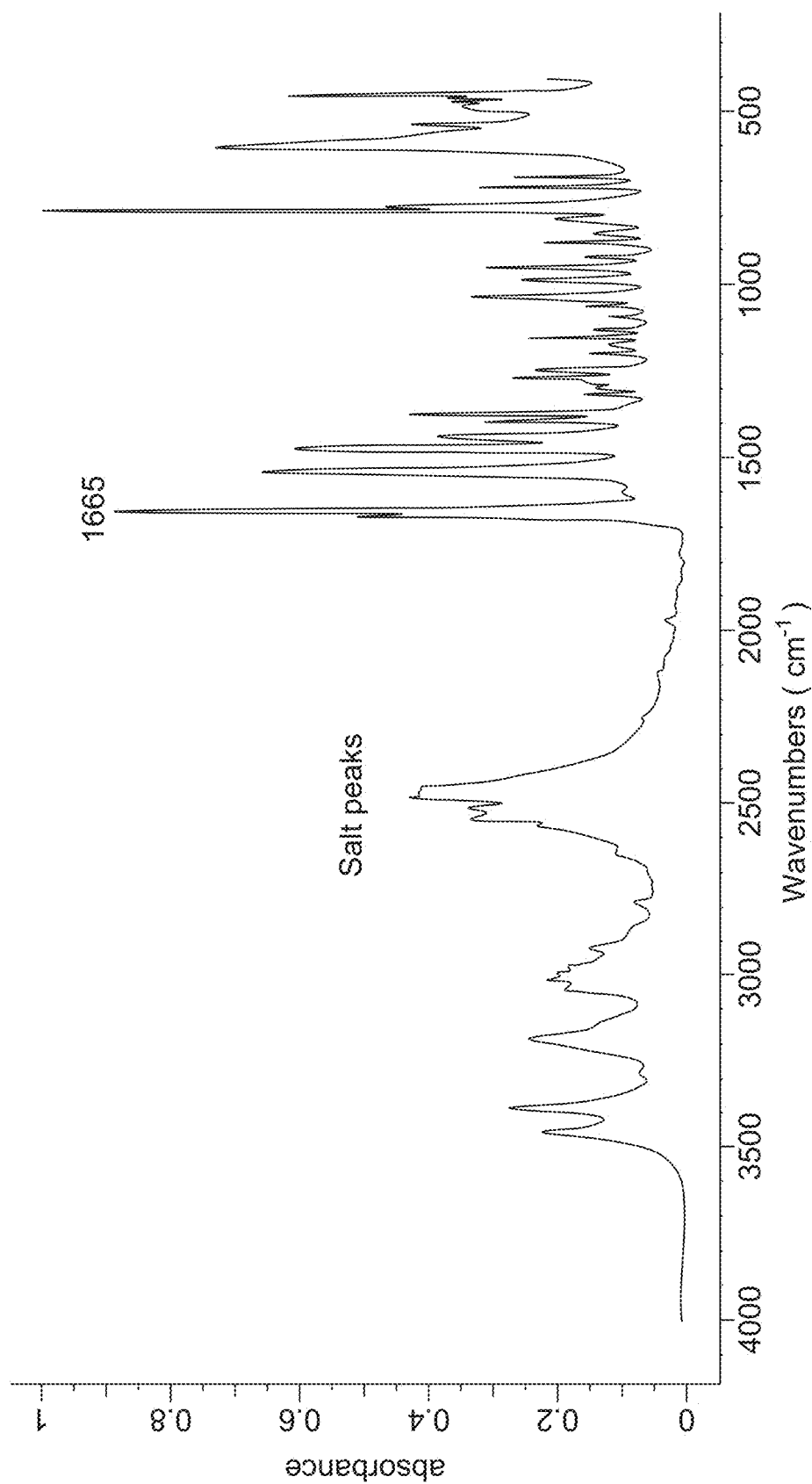
FIG. 4 shows IR spectrum of lidocaine hydrochloride using FTIR. There were two peaks identified in the lidocaine hydrochloride IR spectrum that were unique to lidocaine salt. The wavelength of these peaks was 1665 cm$^{-1}$ for C═O stretching vibration of amide and a unique broad peak between 2000 cm$^{-1}$ and 2800 cm$^{-1}$ showing salt formation.

The invention of a ketoprofen/dexketoprofen and lidocaine drug-drug association to form a novel ketoprofen/dexketoprofen-lidocaine AF has resulted in number of unforeseen and surprisingly meaningful benefits. The ketoprofen/dexketoprofen and lidocaine AF of the invention is designed to target pain that even at mild to moderate levels highly impact quality of life. Twenty percent adults worldwide experience pain and 10% experience chronic pain like back pain; other neuromuscular pain like sprains, contusions and over use; and arthritic and osteoarthritic pain in large and small joints. The CDC estimated that 21% of the US adults experience chronic disabling pain.

The NSAIDS and local anesthetic drug categories for administration as an AF were intentionally chosen to treat pain by two highly different mechanisms of action. This dual action design uniquely provides robust, fast and longer acting, and synergistic pain relief consistent with their individual mechanisms of pain relief.

The present invention relates to novel pharmaceutically acceptable AFs of nonsteroidal anti-inflammatory drugs (NSAIDs) and local anesthetics, e.g., NSAID-local anesthetic AFs, and formulations thereof for use in topical products to treat patients with localized pain and inflammation. The present invention further relates to NSAID-local anesthetic AF acting as an extended release drug delivery system. These NSAID-local anesthetic AFs provide significant prolonged blood levels of the NSAID (e.g., ketoprofen/dexketoprofen) and the local anesthetic (e.g., lidocaine) thereby acting as extended-release drug delivery systems in an AF itself (AF acting as extended release drug delivery system). The present invention further provides ketoprofen/dexketoprofen-lidocaine AFs to target a single medical condition via a dual mechanism of action, while being its own highly effective drug delivery system that remains in its AF for at least one year at room temperature in a topical solution. The NSAIDS and local anesthetic drug categories were intentionally chosen to create ketoprofen/dexketoprofen-lidocaine AF that treats pain by two highly different mechanisms of action. This dual action design uniquely provides robust, fast and longer acting, and synergistic pain relief consistent with their individual mechanisms of pain relief.

In particular, the invention relates to noncovalent, nonionic dexketoprofen-lidocaine AF in a viscous liquid state. The dexketoprofen-lidocaine AFs of the invention are obtained via trituration of dexketoprofen free acid and lidocaine free base; melting and cooling a uniform mixture of dexketoprofen free acid and lidocaine free base; dissolving dexketoprofen free acid and lidocaine free base (individually or together) in a solvent, followed by evaporation of the solvent; or dissolving dexketoprofen free acid and lidocaine free base in a vehicle. The dexketoprofen-lidocaine AFs of the invention can be added to the formulation or prepared in situ, while retaining their AFs in the vehicle of the formulation.

In another embodiment, the invention relates to noncovalent, nonionic ketoprofen-lidocaine AF in a viscous liquid state. The ketoprofen-lidocaine AFs of the invention are obtained via trituration of ketoprofen free acid and lidocaine free base; melting and cooling a uniform mixture of ketoprofen free acid and lidocaine free base; dissolving ketoprofen free acid and lidocaine free base (individually or together) in a solvent, followed by evaporation of the resulting solvent; or dissolving ketoprofen free acid and lidocaine free base in a vehicle. The ketoprofen-lidocaine AFs of the invention can be added to the formulation or prepared in situ, while retaining their AFs in the vehicle of the formulation.

Definitions

The terms used in this specification generally have their ordinary meanings in the art, within the context of this subject matter and in the specific context where each term is used. Certain terms are defined below to provide additional guidance in describing the compositions and methods of the disclosed subject matter and how to make and use them.

The terminology used in the present disclosure is for the purpose of describing particular embodiments only and is not intended to be limiting.

As used herein, the use of the word "a" or "an" when used in conjunction with the term "comprising" in the claims and/or when used in the specification can mean "one," but it is also consistent with the meaning of "one or more," "at least one," and "one or more than one." Still further, the terms "having," "including," "containing," and "comprising" are interchangeable, and one of skill in the art is cognizant that these terms are open-ended terms.

As used herein, "and/or" refers to and encompasses any and all possible combinations of one or more of the associated listed items.

The terms "about" and "approximately," as used interchangeably herein, refer to within an acceptable error range for the particular value as determined by one of ordinary skill in the art, which will depend in part on how the value is measured or determined, i.e., the limitations of the measurement system. Alternatively, "about" can mean a range of up to up to 10%, up to 5%, up to 1%, up to 0.5%, or even up to 0.1% of a given value.

The term "geometric dilution," as used herein, refers to a process of diluting something based on its measured size.

As used herein, the terms "treatment," "treat," and "treating" refer to reversing, alleviating, delaying the onset of, and/or inhibiting the progress of a disease or disorder as described herein. In some embodiments, treatment can be administered after one or more symptoms have developed. In other embodiments, treatment can be administered in the absence of symptoms. For example, treatment can be administered to a susceptible individual prior to the onset of symptoms (e.g., in light of a history of symptoms and/or in light of genetic or other susceptibility factors). Treatment can also be continued after symptoms have resolved, for example to prevent or delay their recurrence.

As used herein, the terms, "patient" and "subject," refer to a human or a nonhuman mammal that is in need or may be in need to receive the topical composition of the present disclosure comprising novel ketoprofen/dexketoprofen-lidocaine AF.

The term "local anesthetic, as used herein, refers to an anesthetic that creates an absence of pain in a specific location of the body without a loss of consciousness. The terms "local anesthetic and "lidocaine" are used interchangeably.

The term "lidocaine free base," as used herein, refers to lidocaine in free base form, e.g., non-salt, lipophilic form of lidocaine. The free base form of lidocaine is generally used in pharmaceutical formulations, e.g., topical creams, ointments, or patches, where the lipophilic nature allows for better penetration through skin.

The term "dexketoprofen free acid," as used herein refers dexketoprofen in free acid form, e.g., active form of dexketoprofen that is not bound to a salt or other stabilizing agent.

The terms "NSAID," "nonsteroidal anti-inflammatory drugs," "anti-inflammatory agent," and "anti-inflammatory drug, as used interchangeably herein, refer to nonsteroidal anti-inflammatory drugs/medications/agents that provide analgesia, relieve or reduce pain, decrease fever, prevent blood clots, and/or decrease inflammation. These terms are used interchangeably with "dexketoprofen" or "ketoprofen."

The term "ionic liquid," as used herein, refers to systems composed primarily of one type of discrete anion and cation.

The terms "low temperature transition mixture (LTTM)," "deep eutectic mixture," and 'deep eutectic solvents (DES), as used interchangeably herein, refer to a noncovalent ionic mixture of an agent that is a hydrogen-bond donor and an agent that is or a hydrogen bond acceptor, such that the LTTM has a melting point that is lower than the melting point of either of the two agents. The LTTM is preferably liquid at room temperature.

The term "substantially free," as used herein, refers to an amount of less than 5% or excluding any functional (e.g., noncontaminating) amount.

The term "consisting of," as used herein, is a closed ended term limiting the scope to only the specified components and excluding any additional elements.

The term "topical formulation," as used herein, refers to a formulation that can be applied to skin or mucosa. Topical formulations may, for example, be used to confer therapeutic benefit to a patient. Topical formulations can be used for both topical and transdermal administration of drug substances.

The term "topical administration," as used herein, refers to delivery of a substance, such as an active agent or an AF of two active agents, to the skin or a localized region of the body.

The term "transdermal administration," as used herein, refers to administration through the skin. Transdermal administration is often applied where systemic delivery of an active is desired, although it may also be useful for delivering an active to tissues underlying the skin with minimal systemic absorption. The terms "transdermal" and "percutaneous" are used interchangeably throughout this specification.

The term "signs and symptoms of inflammation of muscle, tendon, ligaments and other soft tissue", as used herein, include functional weakness, fatigue, pain, swelling, and stiffness.

The term "signs and symptoms of inflammation of joints," as used herein, refers to joint stiffness, redness, decreased range of motion, and pain.

The term "ketoprofen/dexketoprofen AF", as used herein, refers to an extended release AF containing ketoprofen/dexketoprofen and lidocaine in a non-ionic and non-covalent AF that is structurally and physically distinct from the NSAID (free acid or salt thereof) and local anesthetic (free base or salt thereof).

The term "excipient," is used interchangeably herein with antioxidant, antimicrobial preservative, buffer, chelating/sequestering agent, ion-exchange agent, dispersing agent, emollient, emulsifier/surfactant, viscosity-increasing agent, humectant, oil, permeation enhancer, propellant, solvent/solubilizing agent, structure former or modifier, wax, and mixtures thereof. Such excipients generally have their ordinary meaning in the art.

The disclosure provides topical compositions comprising ketoprofen/dexketoprofen-lidocaine AFs (AF), wherein the ketoprofen/dexketoprofen and lidocaine exhibit synergistic action in the treatment of pain when simultaneously applied topically onto the skin as an AF. The compositions provide rapid and sustained/extended absorption of the ketoprofen/dexketoprofen and lidocaine through skin leading to relief from neuromuscular pain (analgesia) and inflammation, without any local side effects like irritation, drying of skin, etc. (alleviation of symptoms and improved tolerance without local or systemic side effects due to lower dose). The novel ketoprofen/dexketoprofen-lidocaine AF and compositions thereof improve local therapeutic efficacy, patient-centered dosing regimen of 1 to 2 times a day, and tolerance for patients leading to better patient compliance and outcomes.

In certain embodiments, the disclosure provides novel ketoprofen/dexketoprofen-lidocaine AF containing combination of the two drugs formulated with specific permeation enhancers for enhanced permeability—the AF is an oily viscous liquid, soluble in solvents providing enhanced skin permeability and facilitating greater amounts of the AF to be absorbed through skin.

In certain embodiments, the novel ketoprofen/dexketoprofen-lidocaine AF and formulations of the disclosure provide extended release of ketoprofen/dexketoprofen and lidocaine over a prolonged time period (ketoprofen/dexketoprofen up to about 96 hours and lidocaine up to about 72 hours) resulting extended delivery of the two drugs to the site of therapeutic action. This unique feature results in improved therapeutic efficacy due to greater compliance from patients as it needs to be applied just once or twice per day.

In certain embodiments, the novel AF and formulations of the disclosure further include additional lidocaine in free base form to provide rapid and extended-drug release at the local site of application, e.g. decrease in pain via blocking of nerve receptors at the local site of application for rapid relief from pain, along with sustained delivery of the two drugs from the AF to the site of therapeutic action. This unique feature results in improved therapeutic efficacy due to greater compliance from patients as it needs to be applied just once or twice per day.

In certain embodiments, the ketoprofen/dexketoprofen-lidocaine topical compositions of the disclosure provide benefit to the patient via co-administration of ketoprofen/ dexketoprofen and lidocaine as an AF and additional lidocaine free base in a topical formulation, such as solution spray, solution, roll-on, drops, gel, cream, lotion, liposomes, nanosomes, transfersomes, ethosomes, emulgels, polyaphron dispersions, topical foam with propellant or propellant-free air-spray pump, topical propellant-based sprays, and a transdermal patch.

Topical compositions of the disclosure comprising the ketoprofen/dexketoprofen-lidocaine AF and along with a uniquely designed topical formulation deliver unassociated lidocaine free base in addition to the extended-release AF to improve the onset of pain relief while providing extended pain relief. The early relief from pain is via blocking of nerve receptors from free lidocaine and the longer pain relief is obtained through the AF extended drug release of both lidocaine and dexketoprofen and its longer NSAID cellular level anti-inflammatory action. Thus, patients do not have to use a separate NSAID composition (oral or topical) and local anesthetic composition (topical) in several (>3-4) applications per day.

The compositions of the disclosure improve solubility, permeability, and prolong therapeutic efficacy of ketoprofen/dexketoprofen free acid and lidocaine free base when present as a synergistic non-ionic AF in a topical composition, with little or no skin irritation.

In certain embodiments, the dexketoprofen-lidocaine compositions of the disclosure comprising the unique dexketoprofen-lidocaine AF on topical administration to human subjects provided unexpected and surprising pharmacokinetic data showing prolonged blood levels of the dexketoprofen and lidocaine. The dexketoprofen-lidocaine AF exhibit a flip-flop pharmacokinetic model, which happens when drug absorption is slower than drug elimination. This shows that the dexketoprofen and lidocaine association acts as an extended-release drug delivery system as the drug-drug association itself. This was surprising and unexpected because no previous literature or experience suggests that the dexketoprofen and lidocaine association would act as a highly effective prolonged release drug delivery system.

Figure 14:
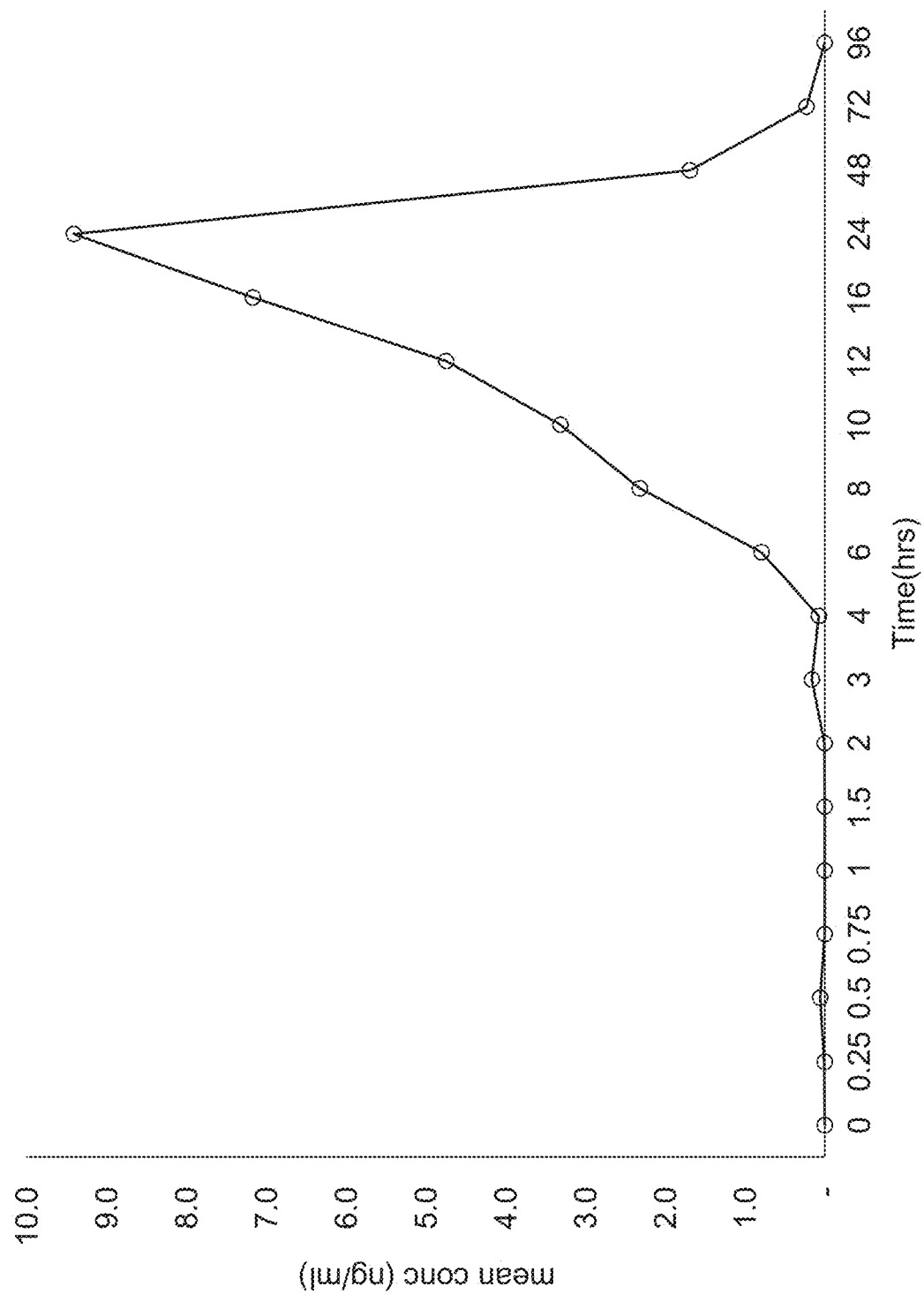
FIG. 14 provides mean plasma conc vs. time curve for lidocaine.
Figure 15:
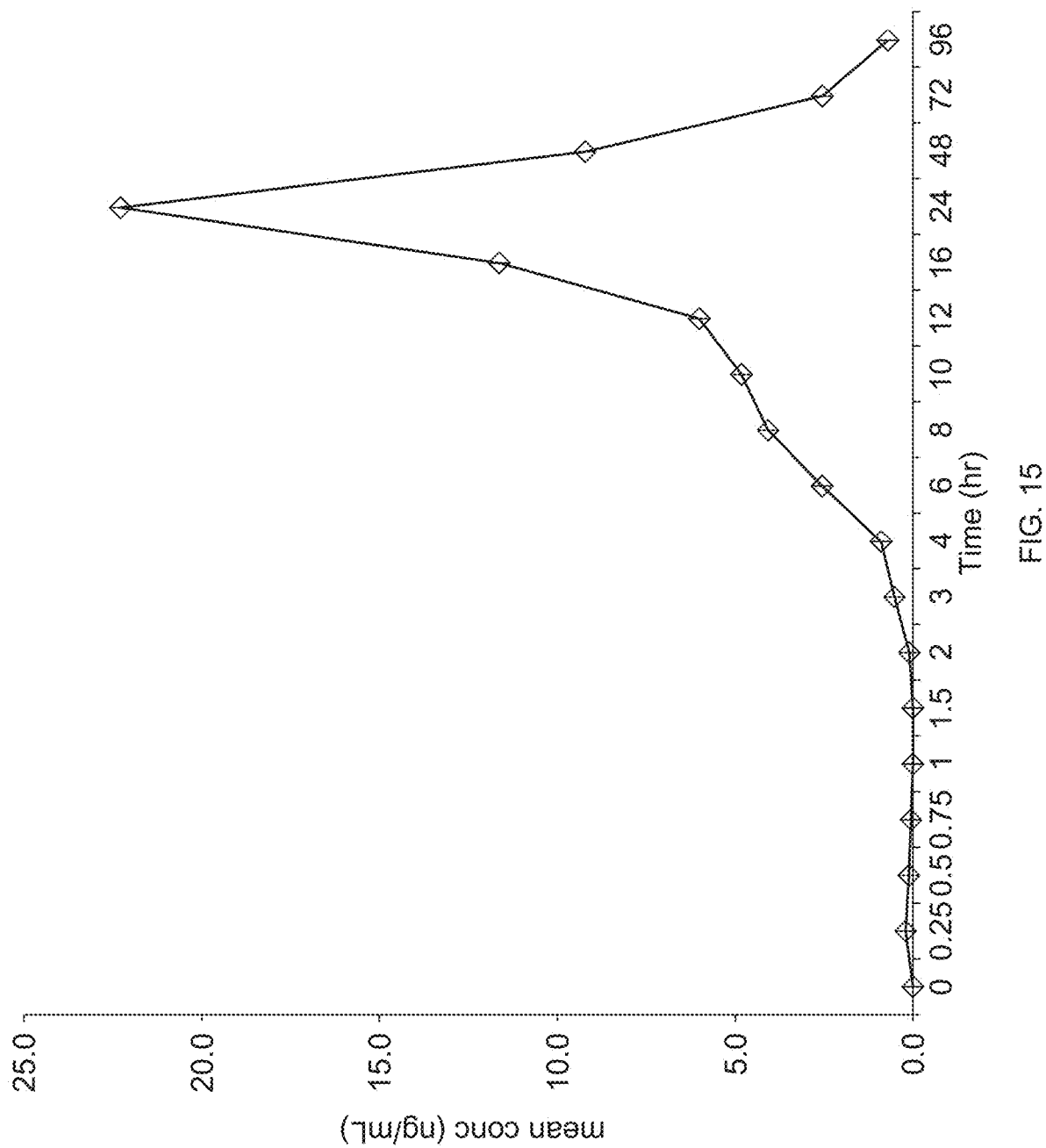
FIG. 15 provides mean plasma concentration vs. time curve for dexketoprofen.

To put the significance of the magnitude of prolonged release in perspective, lidocaine topical Tmax is typically 2 to 4 hours and its biological half-life (t1/2) is 1.5 to 2 hours. This implies that after approximately 10 hours the drug should be mostly cleared from the body. In the case of dexketoprofen oral delivery, the Tmax is 15 to 45 minutes and it biological t1/2 from several reports is 1 to 3 hours and 4 to 6 hours. Thus, dexketoprofen would be mostly eliminated from the body by 30 hours. Surprisingly, the compositions of the disclosure comprising dexketoprofen-lidocaine AF on topical administration to a healthy human subject provided a mean Tmax for lidocaine from about 16 to about 26 hours and dexketoprofen from about 17 to about 37 hours, thereby explaining that the drug-drug association is controlling the delivery of dexketoprofen and lidocaine. The plasma level of both lidocaine and dexketoprofen are significantly prolonged, as shown in FIGS. 14 and 15. Topical administration of the dexketoprofen-lidocaine AF provided lidocaine plasma levels at 48 hour that were 2-fold greater than the lidocaine 6 hour plasma levels. Similarly, dexketoprofen 48 hour plasma levels were 3-fold greater than dexketoprofen 6 hour plasma levels. Plasma levels were detected for dexketoprofen up to about 96 hours and lidocaine up to about 72 hours.

The compositions of the disclosure are suitable for locally delivering NSAID and local anesthetic into the skin and also to other underlying tissues, without significant systemic exposure.

In certain embodiments, the disclosure provides for methods for relief of signs and symptoms of inflammation, of osteoarthritis, relief of signs and symptoms of rheumatoid arthritis, acute or long-term use in the relief of signs and symptoms of ankylosing spondylitis, the method comprising topical administration of compositions comprising ketoprofen/dexketoprofen-lidocaine AF dispersed or dissolved in a suitable vehicle.

In certain embodiments, the disclosure provides for methods for relief from the pain of osteoarthritis of joints amenable to topical treatment, the method comprising topical administration of compositions comprising ketoprofen/dexketoprofen-lidocaine AF dispersed or dissolved in a suitable vehicle.

In certain embodiments, the disclosure provides methods for treating patients with localized pain, e.g., neurological pain, skeletal-muscle pain, joint pain, pain associated with herpes infection, pain associated with itching and insect bites, and wound pain, e.g., sunburn pain, hemorrhoids, or pain from an injury, back pain, sprains, contusions/bruises, the method comprising topical administration of compositions comprising ketoprofen/dexketoprofen-lidocaine AF, and, optionally, lidocaine free base dispersed or dissolved in a suitable vehicle.

In certain embodiments, the ketoprofen/dexketoprofen-lidocaine compositions of the disclosure enhance patient compliance by providing improved therapeutic activities comprising localized numbing from pain at the site of application (e.g., by blocking of nerve endings near the skin surface), along with continued relief from pain and inflammation from ketoprofen/dexketoprofen AF to inflamed sites. In certain embodiments, the disclosure provides novel topical compositions comprising ketoprofen/dexketoprofen-lidocaine AF, and, optionally, lidocaine in free base form, wherein the compositions decrease pain via blocking of nerve receptors from free lidocaine and controlled inhibition of the inflammatory pain from ketoprofen/dexketoprofen-lidocaine AFs. The novel AF formulations of the disclosure result in extended delivery of the two drugs (ketoprofen/dexketoprofen and lidocaine) to the site of therapeutic action. This unique feature results in improved therapeutic efficacy due to greater compliance from patients as it needs to be applied just once or twice per day. It has been surprisingly observed that the novel ketoprofen/dexketoprofen AF acts as an extended release drug delivery system without the presence of any additional release controlling excipients (drug-drug association itself controls and extends drug release). Further, the formulations of the disclosure exhibit an inherent permeability—AF being an oily viscous liquid dissolves in solvents providing enhanced skin permeability and facilitating greater amounts of the AF to be absorbed through skin.

The present invention provides synergistic and prolonged benefit to the patient by means of administration of ketoprofen/dexketoprofen and lidocaine as an AF, optionally, along with lidocaine free base, in a topical formulation, such as solution spray, solution, roll-on, drops, gel, cream, lotion, liposomes, nanosomes, transfersomes, ethosomes, emulgels, polyaphron dispersions, topical foam with propellant or propellant free air-spray pump, topical propellant-based sprays, and a transdermal patch.

Novel Ketoprofen/Dexketoprofen-Lidocaine Associated Forms

The present disclosure provides novel ketoprofen/dexketoprofen-lidocaine AFs that act as an extended release drug delivery systems without the presence of any additional release controlling excipients (drug-drug association itself controls and extends drug release). The novel ketoprofen/dexketoprofen-lidocaine AFs of the disclosure releases drugs in AF over an extended time period and provides plasma levels of ketoprofen/dexketoprofen and lidocaine for prolonged periods (dexketoprofen up to about 96 hours and lidocaine up to about 72 hours) resulting in sustained delivery of the two drugs (ketoprofen/dexketoprofen and lidocaine) to the site of therapeutic action. This unexpected feature results in improved therapeutic efficacy due to greater compliance from patients as it needs to be applied just once or twice per day.

It was surprisingly observed that the novel ketoprofen/dexketoprofen AF acts as an extended release drug delivery system without the presence of any additional release controlling excipients (drug-drug association itself controls and extends drug release). Further, high solubility of the ketoprofen/dexketoprofen-lidocaine AFs in permeation enhancing solvents, e.g., ethanol, isopropyl alcohol, facilitates enhanced absorption of the AF through the skin.

In certain embodiments, the ketoprofen/dexketoprofen-lidocaine AF is prepared by triturating/grinding ketoprofen/dexketoprofen free acid and lidocaine free base using a pestle and mortar, resulting in a viscous liquid.

In certain embodiments, the ketoprofen/dexketoprofen-lidocaine AF is prepared by melting ketoprofen/dexketoprofen free acid and lidocaine free base mixture into a melt, and cooling the mixture into a viscous liquid.

In certain embodiments, the ketoprofen/dexketoprofen-lidocaine AF is prepared by dissolving ketoprofen/dexketoprofen free acid and lidocaine free base in a volatile solvent, followed by evaporating the solvent from the resulting solution, with the residue being a viscous liquid. In certain embodiments, the solvent is selected from the group comprising methanol, ethanol, isopropyl alcohol, acetone, acetonitrile, dichloromethane, and mixtures thereof. In certain embodiments, the volatile solvent is acetone.

In certain embodiments, the ketoprofen/dexketoprofen-lidocaine AF is formed in situ in the vehicle of the topical composition.

In certain embodiments, the dexketoprofen-lidocaine AF comprises dexketoprofen free acid and lidocaine free base in a molar ratio of about 1:1. In certain embodiments, the dexketoprofen-lidocaine AF comprises a dexketoprofen component and a lidocaine component in a weight ratio of about 1:1. In certain embodiments, the topical dexketoprofen-lidocaine compositions of the disclosure provide enhanced NSAID efficacy with reduced NSAID (dexketoprofen) dose compared to the racemic ketoprofen-lidocaine mixture.

In certain embodiments, the ketoprofen/dexketoprofen-lidocaine AF includes association between acid group of ketoprofen/dexketoprofen and amide group of lidocaine.

Figure 6:
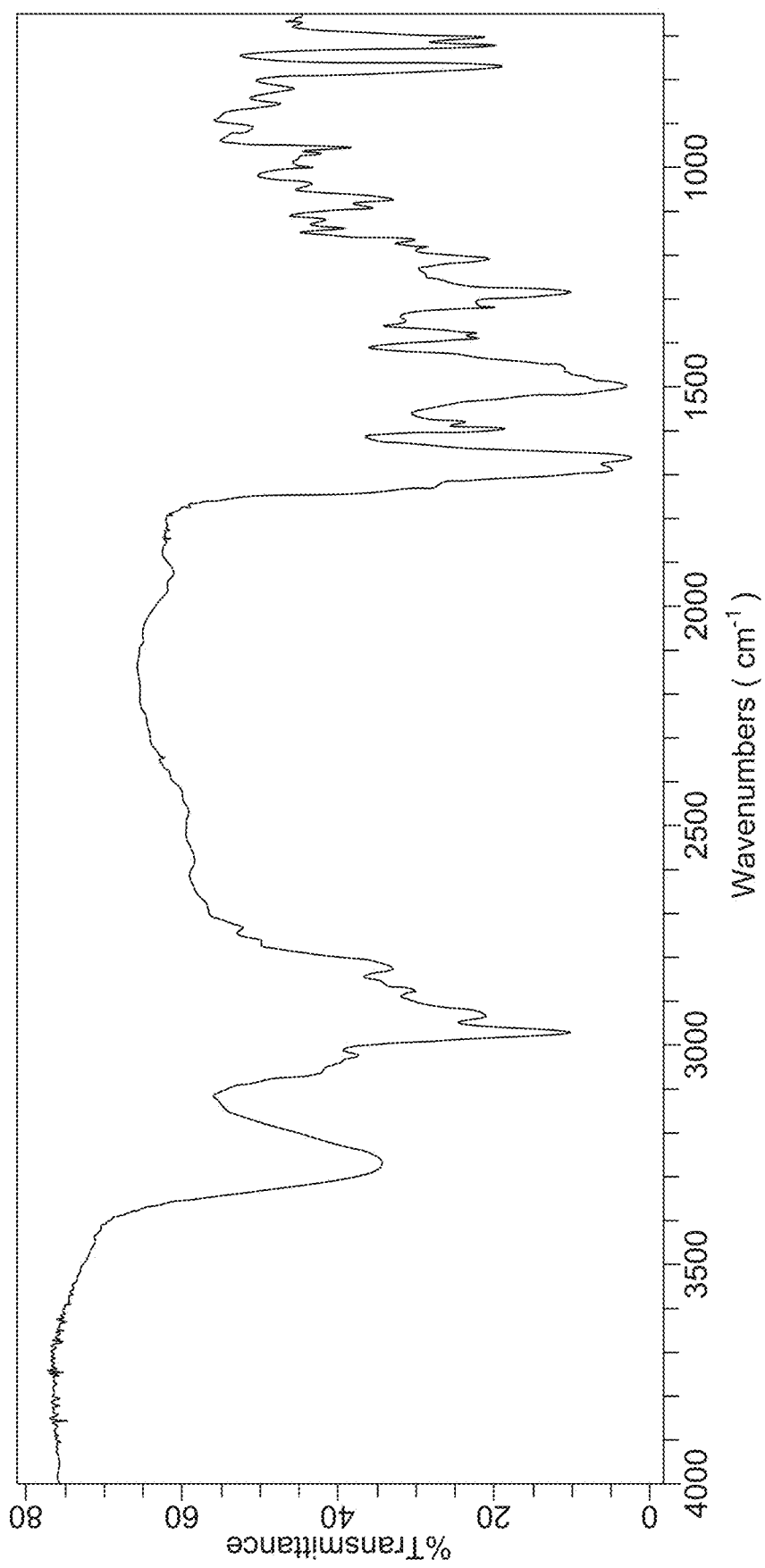
FIG. 6 shows IR spectrum using FTIR of dexketoprofen-lidocaine AF obtained by melting dexketoprofen free acid and lidocaine free base mixture, followed by cooling the mixture into a viscous liquid. The 1729 cm$^{-1}$ peak identified in dexketoprofen free acid and broad peak between 2000 cm$^{-1}$ and 2800 cm$^{-1}$ associated with lidocaine amine salt were absent in the IR spectrum, thereby confirming the formation of dexketoprofen-lidocaine AF that is free of any ionic interaction (including any salt formation) between dexketoprofen acid group and lidocaine amine group.

FIG. 6 shows IR spectrum using FTIR of dexketoprofen-lidocaine AF obtained by melting dexketoprofen free acid and lidocaine free base mixture, followed by cooling the mixture into a viscous liquid. The 1729 cm$^{-1}$ peak identified in dexketoprofen free acid and broad peak between 2000 cm$^{-1}$ and 2800 cm$^{-1}$ associated with lidocaine amine salt were absent in the IR spectrum, thereby confirming the formation of dexketoprofen-lidocaine AF that is free of any ionic interaction (including any salt formation) between dexketoprofen acid group and lidocaine amine group.

Figure 7:
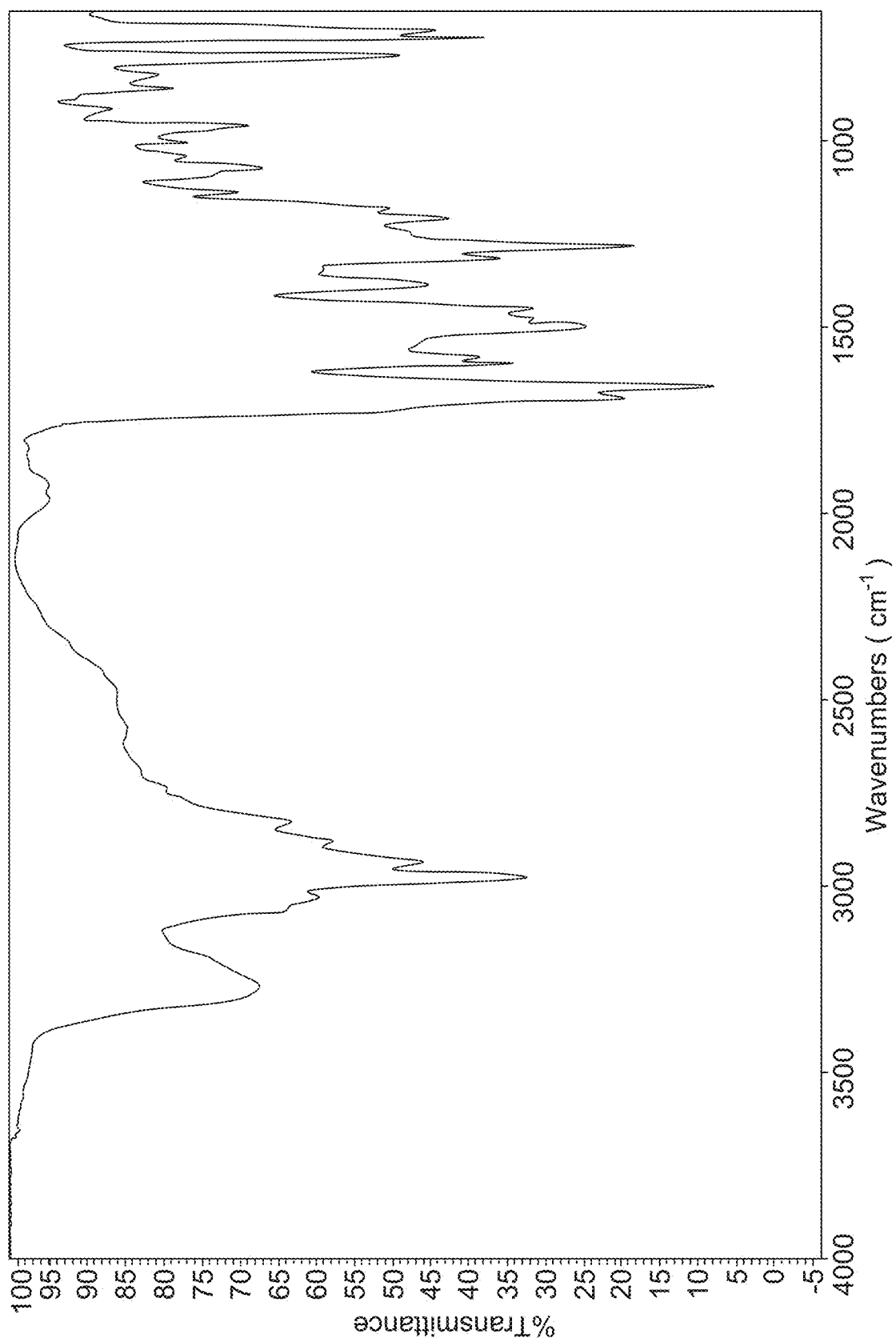
FIG. 7 shows IR spectrum using FTIR of dexketoprofen-lidocaine AF obtained after dissolving dexketoprofen free acid and lidocaine free base in acetone to obtain a solution, followed by evaporating the acetone from the solution. The 1729 cm$^{-1}$ peak identified in dexketoprofen free acid and broad peak between 2000 cm$^{-1}$ and 2800 cm$^{-1}$ associated with lidocaine amine salt were absent in the IR spectrum, thereby confirming the formation of dexketoprofen-lidocaine AF that is free of any ionic interaction (including any salt formation) between dexketoprofen acid group and lidocaine amine group.

FIG. 7 shows IR spectrum using FTIR of dexketoprofen-lidocaine AF obtained after dissolving dexketoprofen free acid and lidocaine free base in acetone to obtain a solution, followed by evaporating the acetone from the solution. The 1729 cm$^{-1}$ peak identified in dexketoprofen free acid and broad peak between 2000 cm$^{-1}$ and 2800 cm$^{-1}$ associated with lidocaine amine salt were absent in the IR spectrum, thereby confirming the formation of dexketoprofen-lidocaine AF that is free of any ionic interaction (including any salt formation) between dexketoprofen acid group and lidocaine amine group.

Figure 8:
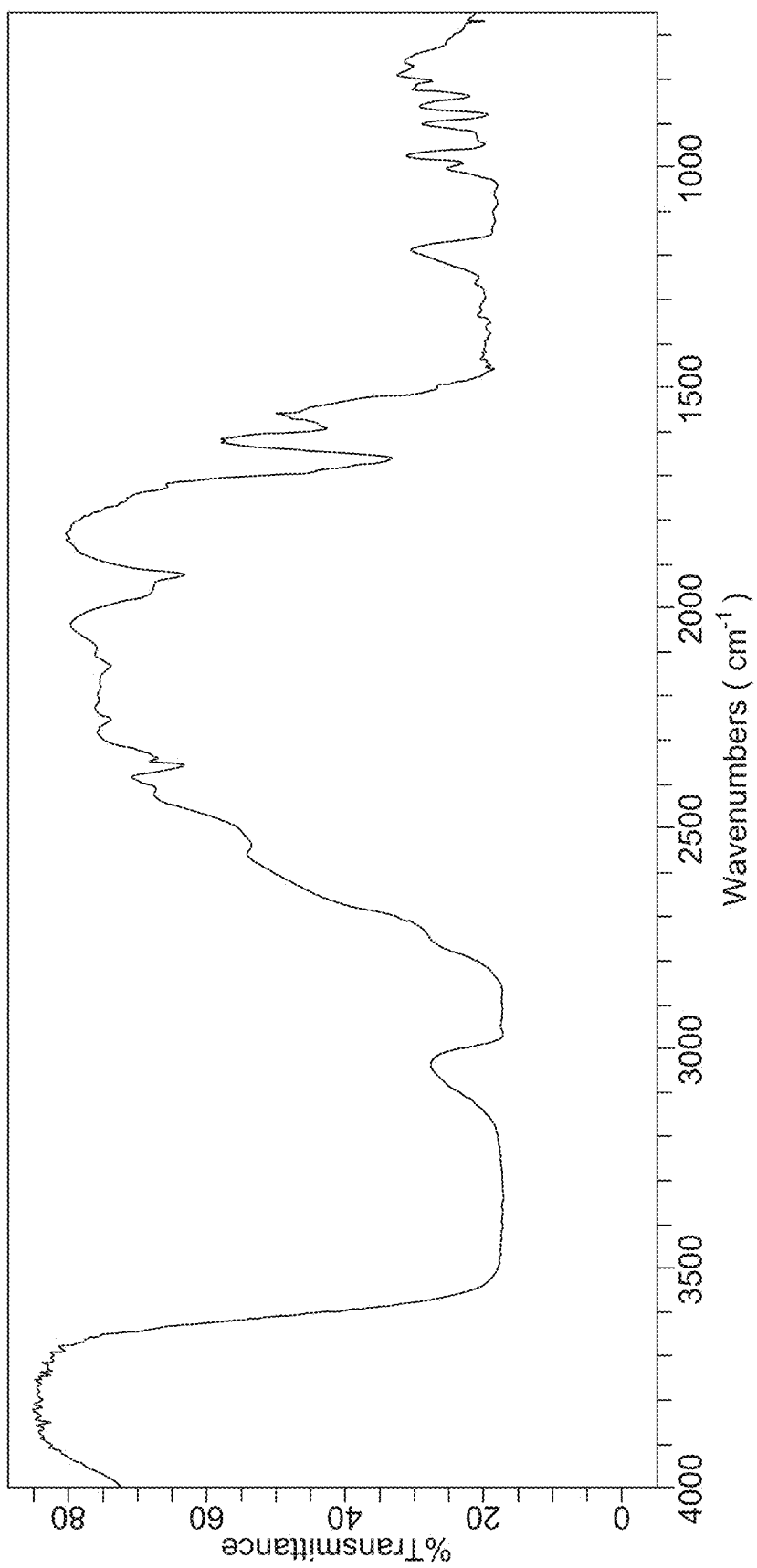
FIG. 8 shows IR spectrum using FTIR of a spray formulation containing a solution of the dexketoprofen-lidocaine AF. The spray formulation is obtained by adding the dexketoprofen-lidocaine AF to the vehicle of the spray formulation. The 1729 cm$^{-1}$ peak identified in dexketoprofen free acid and broad peak between 2000 cm$^{-1}$ and 2800 cm$^{-1}$ associated with lidocaine amine salt were absent in the IR spectrum, thereby confirming that the dexketoprofen-lidocaine AF maintains its AF that is free of any ionic interaction (including any salt formation) between dexketoprofen acid group and lidocaine amine group.
Figure 9:
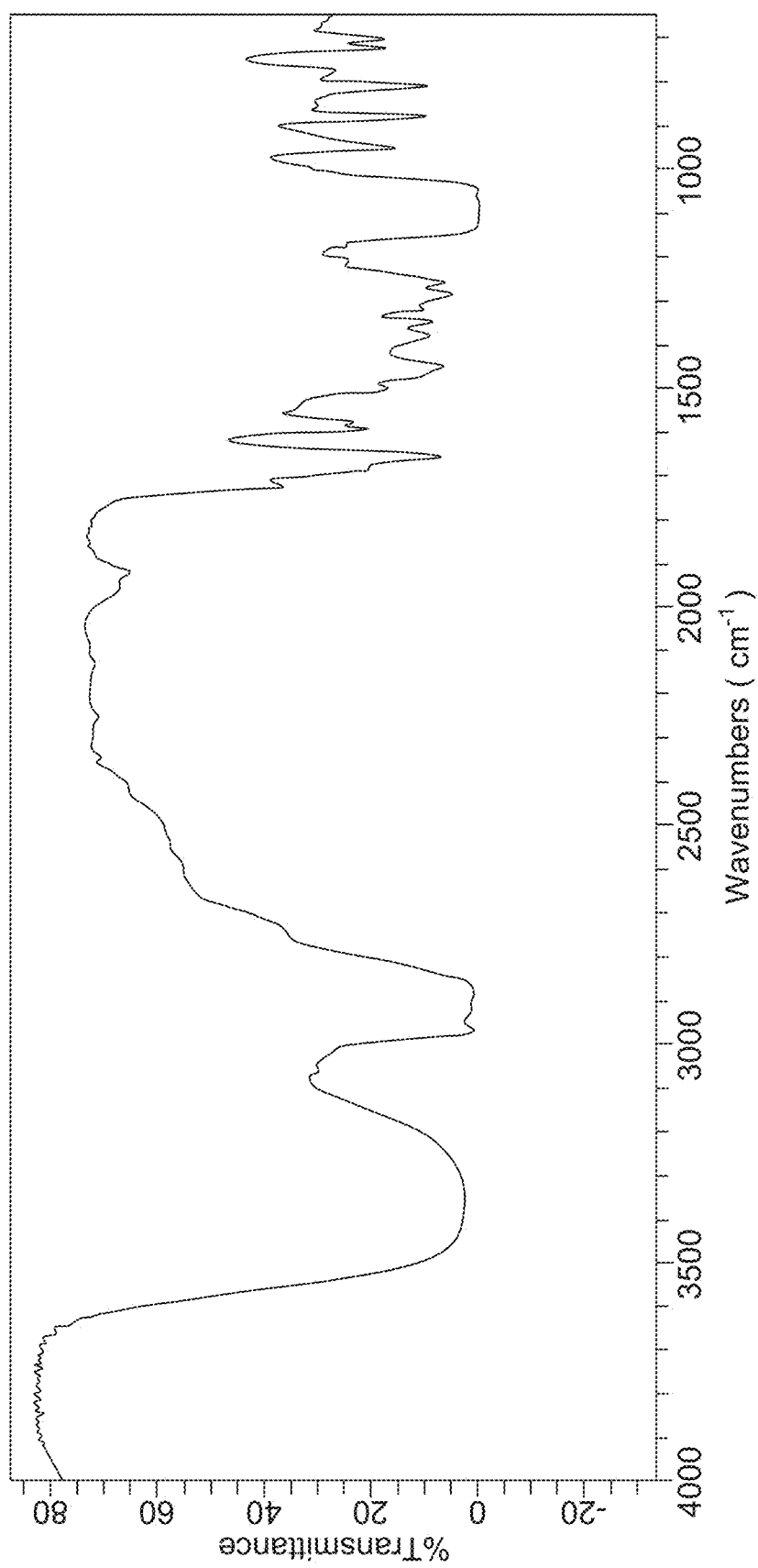
FIG. 9 shows IR spectrum using FTIR of spray formulation containing in situ formed dexketoprofen-lidocaine AF. The spray formulation is obtained by adding the dexketoprofen free acid and lidocaine free base to the vehicle of the spray formulation. The 1729 cm$^{-1}$ peak identified in dexketoprofen free acid and broad peak between 2000 cm$^{-1}$ and 2800 cm$^{-1}$ associated with lidocaine amine salt were absent in the IR spectrum, thereby confirming the formation of dexketoprofen-lidocaine AF that is free of any ionic interaction (including any salt formation) between dexketoprofen acid group and lidocaine amine group.
Figure 10:
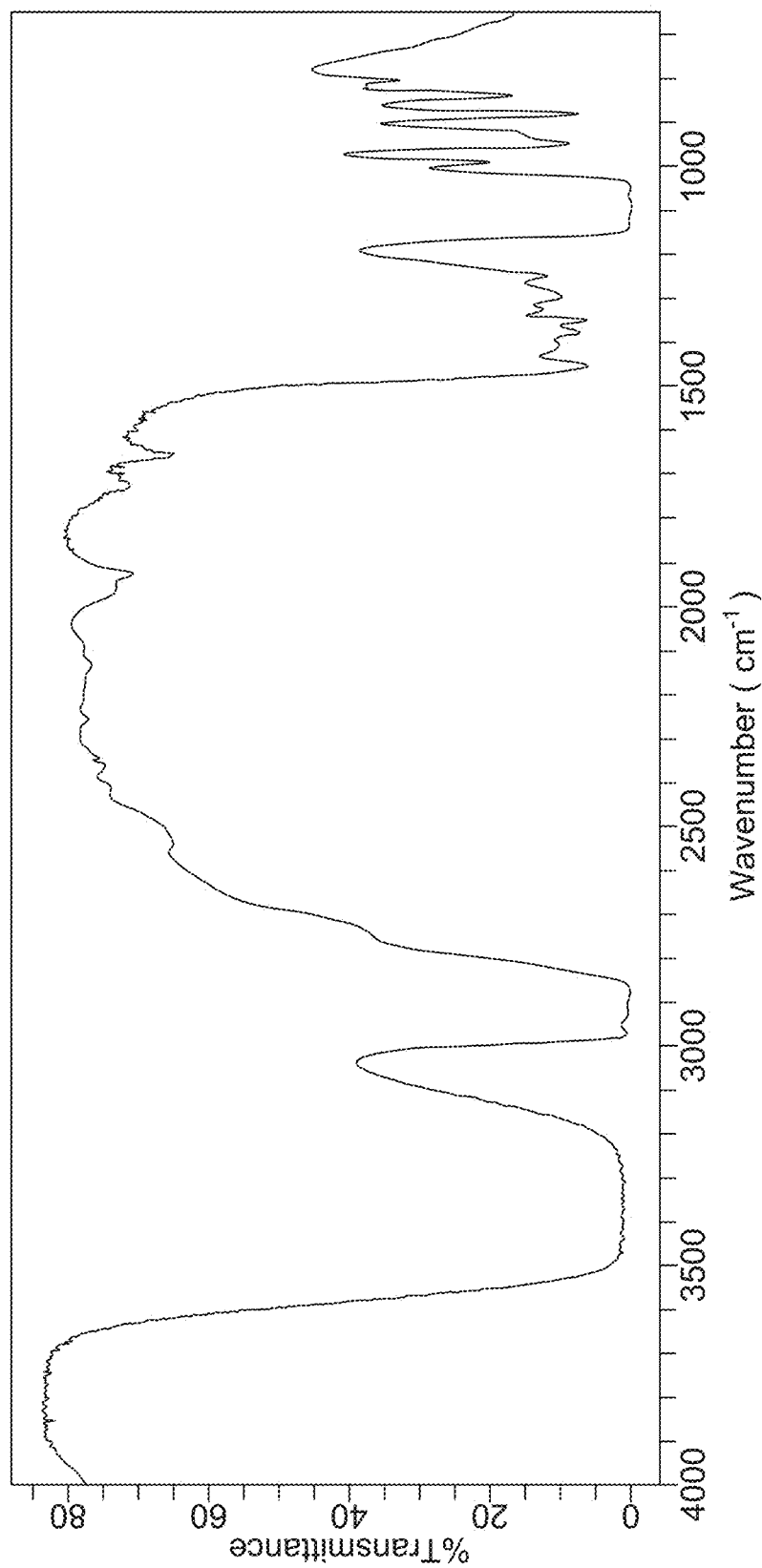
FIG. 10 shows FTIR detection limit of dexketoprofen C═O stretching vibration at 1729 cm$^{-1}$ in a solution formulation spray vehicle is 0.8% w/w.

FIG. 8 shows IR spectrum using FTIR of a spray formulation containing a solution of the dexketoprofen-lidocaine AF. The spray formulation is obtained by adding the dexketoprofen-lidocaine AF to the vehicle of the spray formulation. The 1729 cm$^{-1}$ peak identified in dexketoprofen free acid and broad peak between 2000 cm$^{-1}$ and 2800 cm$^{-1}$ associated with lidocaine amine salt were absent in the IR spectrum, thereby confirming that the dexketoprofen-lidocaine AF maintains its AF that is free of any ionic interaction (including any salt formation) between dexketoprofen acid group and lidocaine amine group.

Topical & Transdermal Compositions

Topical Solution

In certain embodiments, the disclosure provides topical compositions designed to deliver ketoprofen/dexketoprofen and lidocaine in a prolonged manner providing long-lasting therapeutic effect and improving patient compliance.

In certain embodiments, the topical compositions comprise ketoprofen/dexketoprofen-lidocaine AF, and, optionally, lidocaine free base for immediate delivery of lidocaine from lidocaine free base and sustained delivery of ketoprofen/dexketoprofen and lidocaine from ketoprofen/dexketoprofen-lidocaine AF through skin. The topical compositions of the disclosure are designed to provide rapid relief from pain via blocking of nerve receptors with free lidocaine followed by sustained delivery of ketoprofen/dexketoprofen and lidocaine through skin to provide prolonged therapeutic effect. The topical compositions of the disclosure are designed to release ketoprofen/dexketoprofen and lidocaine over an extended period. This property reduces the need for frequent dosing/applications and maintains stable plasma levels of the drugs.

It has been surprisingly observed that the novel ketoprofen/dexketoprofen-lidocaine AF of the disclosure acts as an extended release drug delivery system without the presence of any additional release controlling excipients (drug-drug association itself controls and extends drug release). Further, the formulations of the disclosure exhibit an inherent permeability—AF being an oily viscous liquid dissolves in solvents providing enhanced skin permeability and facilitating greater amounts of the AF to be absorbed through skin. In certain embodiments, the disclosure provides topical solution compositions (topical solutions) comprising ketoprofen/dexketoprofen-lidocaine AF dissolved in a suitable vehicle and dispensed using a topical spray, foam, gel, dropper or a roll-on device.

In certain embodiments, the disclosure provides topical solutions comprising ketoprofen/dexketoprofen-lidocaine AF, wherein the AF is formed in situ in the solution. The solutions are obtained by dissolving ketoprofen/dexketoprofen free acid and lidocaine free base in a vehicle, which are then dispensed using a topical spray, dropper or a roll-on device. In certain embodiments, the solution is dispensed as a gel using collapsible tube or pump device.

In certain embodiments, the solutions comprise from about 1 wt % to about 99 wt % of AF, based on the total weight of the solution. In certain embodiments, the solutions comprise about 5 wt %, about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, or intermediate values therein, of ketoprofen/dexketoprofen-lidocaine AF, based on the total weight of the solution. In certain embodiments, the solutions comprise about 33 wt %, about 40 wt %, about 50 wt %, about 67 wt %, or intermediate wt % therein of AF, based on the total weight of the solution.

In certain embodiments, the solution comprises ketoprofen/dexketoprofen-lidocaine AF and lidocaine free base in the ratio of AF:lidocaine free base weight ratio of from about 25:75 to about 75:25. In certain embodiments, the solution comprises ketoprofen/dexketoprofen-lidocaine AF and lidocaine free base in an AF:lidocaine free base weight ratio of about 25:75, about 33:67, about 40:60, about 50:50, about 60:40, about 67:33, 75:25, or intermediate ratios therein.

In certain embodiments, the topical solutions are made by dissolving the ketoprofen/dexketoprofen-lidocaine AF in a suitable vehicle comprising an antimicrobial preservative, chelating/metal sequestering agent, humectant, permeation enhancer, solvent, structure modifying agent, or mixtures thereof.

In certain embodiments, the topical solutions are made by dissolving the ketoprofen/dexketoprofen-lidocaine AF in a suitable vehicle comprising a solvent selected from the group comprising a monovalent alcohol such as ethanol, propanol, isopropanol, decyl alcohol; a divalent alcohol such as propylene glycol, butylene glycol, dipropylene glycol, polyethylene glycol or hexylene glycol; a trivalent alcohol such as glycerin, hexanetriol; dimethyl sulfoxide; triacetin; propylene carbonate; and any mixtures thereof.

Following Table 1 provides solvents and their amounts that can be used in a topical solution of ketoprofen/dexketoprofen-lidocaine AF.

TABLE 1

| Solvent | Typical range (% w/w) |
|---|---|
| Ethanol | 5-95 |
| Isopropanol | 5-95 |
| Propylene glycol | 5-95 |
| Butylene glycol | 5-95 |
| Dipropylene glycol | 5-95 |
| Hexylene glycol | 5-95 |
| Glycerin | 5-95 |
| Hexane triol | 1-10 |
| Polyethylene glycol (PEG) | 5-95 |
| Dimethyl sulfoxide | 5-95 |
| Propylene carbonate | 5-95 |

In certain embodiments, the vehicle further comprises a permeation enhancer, an antimicrobial preservative, an antioxidant, a chelating/metal sequestering agent, and/or a humectant.

In certain embodiments, solvents, for example, ethanol, isopropyl alcohol, propanol, glycerin, dimethyl sulfoxide, pentadecalactone function as permeation enhancers as well. In certain embodiments, the penetration enhancers are present in an amount of about 5-95% w/w, based on the total formulation weight.

In certain embodiments, the permeation enhancer is selected from the group comprising ethanol, isopropyl alcohol, propanol, glycerin, dimethyl sulfoxide, pentadecalactone, cis-oleic acid, trans-oleic acid, 2-nonyl-1,3-dioxane, n-lauroyl sarcosine, laurocapram. sorbitan monolaurate, terpenes, terpenoids or essential oils, pyrrolidones and azones, isopropyl myristate, isopropyl palmitate, glyceryl monostearate, glyceryl monooleate, glycols, glycerides, poloxamers, phospholipids, triacetin, propylene glycol, 2-nony-1,3-dioxane, octisalate, pentadecalactone, diethylene glycol monoethyl ether, N-methyl pyrrolidone, and mixtures thereof.

In certain embodiments, the antimicrobial preservative is selected from the group comprising benzyl alcohol, chlorobutanol, m-cresol, methyl paraben, propyl paraben, phenoxyethanol, benzalkonium chloride, benzethonium chloride, thimersol, ethanol, isopropyl alcohol, propylene glycol, cetylpyridinium chloride, potassium sorbate, benzoic acid, and benzoates. and mixtures thereof.

Following Table 2 provides antimicrobial preservatives and their amounts that can be used in a topical solution of ketoprofen/dexketoprofen-lidocaine AF.

TABLE 2

| Antimicrobial preservative | Typical range (% w/w) |
|---|---|
| Potassium sorbate | 0.1-10 |
| Benzoic acid | 0.1-10 |
| Sodium benzoate | 0.1-10 |
| Ethanol | 2-70 |
| Isopropyl alcohol | 2-70 |
| Cetylpyridinium chloride | 0.05-0.5 |
| Propyl paraben | 0.001-1 |
| Methyl paraben | 0.05-2 |
| Benzalkonium chloride | 0.01-0.5 |
| Phenoxyethanol | 0.2-2 |

In certain embodiments, the antioxidant is selected from the group comprising acetyl cysteine, ascorbic acid, ascorbyl palmitate, m-cresol, p-cresol, butylated hydroxyanisole (BHA), butylated hydroxytoluene (BHT), cysteine/cysteinate HCl, dithiothreitol, dithionite sodium, glutamate monosodium, glutathione, hydroquinone, hydroxyquinone, metabisulfite potassium/sodium, monothioglycerol, propyl gallate, pyrogallol, sodium bisulfite, sodium metabisulfite, sodium thiosulfate, sodium sulfite, tertiary butylhydroquinone (TBHQ), α-tocopherol and tocofersolan (Vit. E TPGS) and mixtures thereof.

Following Table 3 provides antioxidants and their amounts that can be used in a topical solution of ketoprofen/dexketoprofen-lidocaine AF.

TABLE 3

| Antioxidant | Typical range (% w/w) |
|---|---|
| Butylated hydroxyanisole (BHA) | 0.001-1 |
| Butylated hydroxytoluene (BHT) | 0.01-0.5 |
| Propyl gallate | 0.01-0.5 |
| Alpha-tocopherol | 0.1-1 |
| Tocofersolan (Vitamin E TPGS) | 0.1-10 |

In certain embodiments, the topical solution composition comprises at least one chelating/metal sequestering agent selected from the group comprising alanine, citric acid, cysteine, EDTA, fumaric acid, gluconic acid, glycine, leucine, pyrophosphate, and valine and mixtures thereof.

In certain embodiments, the topical solution composition comprises at least one emollient/humectant to improve skin tolerability. In certain embodiments, the emollient/humectant is selected from the group comprising polyhydric alcohols, e.g., glycerin, propylene glycol, polyethylene glycol, sorbitol, triacetin, butylene glycol, polyvinylpyrrolidone, hydroxy acid, panthenol, hyaluronic acid, sodium hyaluronate, honey, sorbitol, seaweed, urea, lactic acid, aloe vera, allantoin, sodium pyrrolidone carboxylic acid, propanediol, and mixtures thereof. In certain embodiments, the emollients/humectants are present in an amount of from about 0.01 to about 20% w/w.

In certain embodiments, the vehicle can further comprise a structure-modifying agent selected from the group comprising acacia, alginate sodium, bentonite, carbomer, carboxymethylcellulose sodium, carrageenan, cholesterol, guar gum, hectorite, hydroxyethyl cellulose, hydroxypropyl cellulose, hypromellose, magnesium aluminum silicate, methylcellulose, microcrystalline cellulose, poloxamer, polyvinyl alcohol, povidone, tragacanth, veegum xanthan gum, and mixtures thereof.

The above solution formulations can be dispensed using a topical spray, dropper or a roll-on device for ease of spreadability. In certain embodiments, the solutions are dispensed as gels using a collapsible tube or device.

Topical Foam (Non-Propellant)

Foams are emulsified systems packaged in containers or special dispensing devices that contain dispersed gas bubbles, usually in liquid continuous phase, that when dispersed has fluffy, semisolid consistency.

Topical foams are an attractive and promising delivery system for cosmetic, pharmaceutical and medical applications due to their beneficial properties like ease of spreading and improved contact with the skin, ease of application and enhanced acceptability/compliance by patients. In certain embodiments, the topical compositions are topical foam compositions comprising ketoprofen/dexketoprofen-lidocaine AF.

In certain embodiments, the disclosure provides topical foam compositions comprising ketoprofen/dexketoprofen-lidocaine AF, and, optionally, lidocaine free base, dispersed or dissolved in a suitable vehicle comprising a solvent, emulsifier/surfactant, a permeation enhancer, antimicrobial preservative, antioxidant, chelating/metal sequestering agent, buffer and/or a humectant. In certain embodiments, the disclosure provides topical foam compositions comprising ketoprofen/dexketoprofen-lidocaine AF in an amount of from about 1 wt % to about 99 wt %, based on the total weight of the foam composition.

In certain embodiments the vehicle is a solvent selected from the group comprising a monovalent alcohol, a divalent alcohol, a trivalent alcohol, and mixtures thereof. In certain embodiments, the solvent is a monovalent alcohol selected from the group comprising ethanol, propanol, isopropanol, decyl alcohol, and mixtures thereof. In certain embodiments, the solvent is a divalent alcohol selected from the group comprising propylene glycol, butylene glycol, dipropylene glycol, hexylene glycol, polyethylene glycol and mixtures thereof. In certain embodiments, the vehicle is a trivalent alcohol selected from the group comprising glycerin, hexanetriol, and mixtures thereof. In certain embodiment, the vehicle is selected from the group comprising dimethyl sulfoxide, triacetin, propylene carbonate, and mixtures thereof.

In certain embodiments, the vehicle can further comprise a emulsifier/surfactant (dispersing agent) selected from the group comprising ammonium lauryl sulfate, sodium lauryl sulfate, trolamine lauryl sulfate, glyceryl monostearate, hexylene glycol, phosphatidic acid, phosphatidylserine, phosphatidylethanolamine, phosphatidylcholine, phosphatidylglycerol, phosphatidylinositol, polysorbates, polyethylene glycol-8 caprylic/capric glycerides sorbitan monolaurate, sorbitan palmitate, sorbitan monooleate, sorbitan monostearate, sorbitan sesquioleate, sorbitan trioleate, sorbitan oleate lecithin, tocopheryl polyethylene glycol 100 succinate, and mixtures thereof.

In certain embodiments, the vehicle can further comprise a permeation enhancer selected from the group comprising ethanol, isopropyl alcohol, propanol, glycerin, dimethyl sulfoxide, pentadecalactone, cis-oleic acid, trans-oleic acid, 2-nonyl-1,3-dioxane, n-lauroyl sarcosine, laurocapram. sorbitan monolaurate, terpenes, terpenoids or essential oils, pyrrolidones and azones, isopropyl myristate, isopropyl palmitate, glyceryl monostearate, glyceryl monooleate, glycols, glycerides, poloxamers, phospholipids, triacetin, propylene glycol, 2-nony-1,3-dioxane, octisalate, pentadecalactone, diethylene glycol monoethyl ether, N-methyl pyrrolidone, and mixtures thereof.

In certain embodiments, the vehicle can further comprise an antimicrobial preservative selected from the group comprising benzyl alcohol, chlorobutanol, m-cresol, methyl paraben, propyl paraben, phenoxyethanol, benzalkonium chloride, benzethonium chloride, thimersol, ethanol, isopropyl alcohol, propylene glycol, cetylpyridinium chloride, potassium sorbate, benzoic acid, benzoates, and mixtures thereof.

In certain embodiments, the vehicle can further comprise an antioxidant from the group comprising acetyl cysteine, ascorbic acid, ascorbyl palmitate, m-cresol, p-cresol, butylated hydroxyanisole (BHA), butylated hydroxytoluene (BHT), cysteine/cysteinate HCl, dithiothreitol, dithionite sodium, glutamate monosodium, glutathione, hydroquinone, hydroxyquinone, metabisulfite potassium/sodium, monothioglycerol, propyl gallate, pyrogallol, sodium bisulfite, sodium metabisulfite, sodium thiosulfate, sodium sulfite, tertiary butylhydroquinone (TBHQ), α-tocopherol, tocofersolan (Vit. E TPGS), and mixtures thereof.

In certain embodiments, the vehicle can further comprise a chelating/metal sequestering agent from the group comprising alanine, citric acid, cysteine, EDTA, fumaric acid, gluconic acid, glycine, leucine, pyrophosphate, valine, and mixtures thereof.

In certain embodiments, the vehicle can further comprise a humectant/emollient selected from the group comprising aloe vera, butylene glycol, glycerin, hexylene glycol, maltitol, polyethylene glycol, propylene glycol, and sorbitol, urea, and xylitol. triacetin, butylene glycol, polyvinylpyrrolidone, panthenol, hyaluronic acid, sodium hyaluronate, honey, sorbitol, seaweed, urea, aloe vera, allantoin, sodium pyrrolidone, propanediol, and mixtures thereof.

In certain embodiments, the vehicle can further comprise an emollient selected from the group comprising aloe vera, cyclomethicone, dimethicone, lanolin, mineral oil, petrolatum, shea butter, and mixtures thereof.

In certain embodiments, the vehicle can further comprise a buffer selected from the group comprising acetate, ammonium, benzenesulfonic acid, bicarbonate, citrate, glycine, hydrochloric acid, lactic acid, maleic acid, methane sulfonic acid, phosphate, sodium hydroxide, tartrate, tromethamine, and mixtures thereof.

In certain embodiments, one vehicle component exhibits multiple functions, e.g., acts as a solvent, emulsifier/surfactant, permeation enhancer, antimicrobial preservative, and/or humectant/emollient.

Propellant Topical Spray/Topical Aerosol

In certain embodiments, the topical compositions are propellant topical spray/topical aerosol compositions comprising ketoprofen/dexketoprofen-lidocaine AF. In certain embodiments, the propellant topical spray/topical aerosol compositions contain dexketoprofen-lidocaine AF, and, optionally, lidocaine free base.

Propellant sprays are pharmaceutical compositions that are packaged under pressure. The active ingredients are released as fine liquid droplets upon activation of an appropriate valve system.

In certain embodiments the vehicle is a solvent selected from the group comprising a monovalent alcohol, a divalent alcohol, a trivalent alcohol, or a mixture thereof. In certain embodiments, the solvent is a monovalent alcohol selected from the group comprising ethanol, propanol, isopropanol, decyl alcohol, and mixtures thereof. In certain embodiments, the solvent is a divalent alcohol selected from the group comprising propylene glycol, butylene glycol, dipropylene glycol, hexylene glycol, polyethylene glycol and mixtures thereof. In certain embodiments, the vehicle is a trivalent alcohol selected from the group comprising glycerin, hexanetriol, and mixtures thereof. In certain embodiment, the vehicle is selected from the group comprising dimethyl sulfoxide, triacetin, propylene carbonate, and mixtures thereof.

In certain embodiments, the vehicle can further comprise a emulsifier/surfactant (dispersing agent) selected from the group comprising ammonium lauryl sulfate, sodium lauryl sulfate, trolamine lauryl sulfate, glyceryl monostearate, hexylene glycol, phosphatidic acid, phosphatidylserine, phosphatidylethanolamine, phosphatidylcholine, phosphatidylglycerol, phosphatidylinositol, polysorbates, polyethylene glycol-8 caprylic/capric glycerides sorbitan monolaurate, sorbitan palmitate, sorbitan monooleate, sorbitan monostearate, sorbitan sesquioleate, sorbitan trioleate, sorbitan oleate lecithin, tocopheryl polyethylene glycol 100 succinate, and mixtures thereof.

In certain embodiments, the vehicle can further comprise a permeation enhancer selected from the group comprising ethanol, isopropyl alcohol, propanol, glycerin, dimethyl sulfoxide, pentadecalactone, cis-oleic acid, trans-oleic acid, 2-nonyl-1,3-dioxane, n-lauroyl sarcosine, laurocapram. sorbitan monolaurate, terpenes, terpenoids or essential oils, pyrrolidones and azones, isopropyl myristate, isopropyl palmitate, glyceryl monostearate, glyceryl monooleate, glycols, glycerides, poloxamers, phospholipids, triacetin, propylene glycol, 2-nony-1,3-dioxane, octisalate, pentadecalactone, diethylene glycol monoethyl ether, N-methyl pyrrolidone, and mixtures thereof.

In certain embodiments, the vehicle can further comprise an antimicrobial preservative selected from the group comprising benzyl alcohol, chlorobutanol, m-cresol, methyl paraben, propyl paraben, phenoxyethanol, benzalkonium chloride, benzethonium chloride, thimersol, ethanol, isopropyl alcohol, propylene glycol, cetylpyridinium chloride, potassium sorbate, benzoic acid, benzoates, and mixtures thereof.

In certain embodiments, the vehicle can further comprise an antioxidant from the group comprising acetyl cysteine, ascorbic acid, ascorbyl palmitate, m-cresol, p-cresol, butylated hydroxyanisole (BHA), butylated hydroxytoluene (BHT), cysteine/cysteinate HCl, dithiothreitol, dithionite sodium, glutamate monosodium, glutathione, hydroquinone, hydroxyquinone, metabisulfite potassium/sodium, monothioglycerol, propyl gallate, pyrogallol, sodium bisulfite, sodium metabisulfite, sodium thiosulfate, sodium sulfite, tertiary butylhydroquinone (TBHQ), α-tocopherol, tocofersolan (Vit. E TPGS), and mixtures thereof.

In certain embodiments, the vehicle can further comprise a chelating/metal sequestering agent from the group comprising alanine, citric acid, cysteine, EDTA, fumaric acid, gluconic acid, glycine, leucine, pyrophosphate, valine, and mixtures thereof.

In certain embodiments, the vehicle can further comprise a humectant selected from the group comprising aloe vera, butylene glycol, glycerin, hexylene glycol, maltitol, polyethylene glycol, propylene glycol, and sorbitol, urea, and xylitol. triacetin, butylene glycol, polyvinylpyrrolidone, panthenol, hyaluronic acid, sodium hyaluronate, honey, sorbitol, seaweed, urea, aloe vera, allantoin, sodium pyrrolidone, propanediol, and mixtures thereof.

In certain embodiments, the vehicle can further comprise an emollient/humectant selected from the group comprising aloe vera, cyclomethicone, dimethicone, lanolin, mineral oil, petrolatum, shea butter, and mixtures thereof.

In certain embodiments, the vehicle can further comprise a buffer selected from the group comprising acetate, ammonium, benzenesulfonic acid, bicarbonate, citrate, glycine, hydrochloric acid, lactic acid, maleic acid, methane sulfonic acid, phosphate, sodium hydroxide, tartrate, tromethamine, and mixtures thereof.

In certain embodiments, the vehicle can further comprise a propellant selected from the group comprising butane, carbon dioxide, compressed air, difluoroethane, dimethyl ether, hydrofluoroalkenes, isobutane, nitrogen, propane, and mixtures thereof.

In certain embodiments, one vehicle component exhibits multiple functions, e.g., acts as a solvent, emulsifier/surfactant, permeation enhancer, antimicrobial preservative, and/or humectant/emollient.

Transdermal Patch

In certain embodiments, the topical compositions are transdermal patch compositions comprising ketoprofen/dexketoprofen-lidocaine AF. In certain embodiments, the transdermal patch compositions contain dexketoprofen-lidocaine AF, and, optionally, lidocaine free base.

In certain embodiments, the ketoprofen/dexketoprofen-lidocaine AF is formulated as reservoir patch, layered patch, or drug/adhesive layer patch or combination. The drug reservoir patch has a drug excipient matrix that is placed between an impermeable outer barrier polymer film and a rate controlling polymeric membrane. An adhesive layer is applied to the rate controlling membrane. A layered patch generally has three layers consisting of an outer impermeable polymer barrier, drug-excipient reservoir, and drug-adhesive layer that is in contact with drug reservoir layer. The drug/adhesive layer patch has an outer impermeable polymer barrier and a casted drug/excipient/adhesive layer that is in contact with the impermeable barrier.

In certain embodiments, the ketoprofen/dexketoprofen-lidocaine AF is formulated as membrane moderated transdermal reservoir patch comprising a drug reservoir/polymer matrix surrounded by a porous polymeric membrane and a backing layer made of impermeable metallic plastic laminate. Release of the ketoprofen/dexketoprofen-lidocaine AF in the transdermal patch is controlled by the formation of molecular dispersion of the AF in the polymer matrix comprising a polymer selected from the group comprising hydroxypropyl methylcellulose (HPMC), polyacrylates, polyvinylpyrrolidone, polyvinyl alcohol, sodium alginate, silicone elastomers, ethyl cellulose, and HPMC/Chitosan.

In certain embodiments, the ketoprofen/dexketoprofen-lidocaine AF is formulated as a microreservoir transdermal patch combining matrix dispersion with a drug reservoir. The reservoir is prepared by suspending the ketoprofen/dexketoprofen-lidocaine AF in an aqueous solution of hydrophilic polymer, then homogeneously dispersing the suspended AF on a lipophilic polymer to obtain a uniform dispersion of the ketoprofen/dexketoprofen-lidocaine AF. The dispersion is carried out using a high shear mechanical force, which results in the formation of thousands of microscopic, unleachable spheres. In certain embodiments, the dispersion further comprises crosslinking polymeric agents to improve thermodynamic stability of the dispersion.

Polymers employed in transdermal patch formulations have various functions, such as matrix formation, drug delivery rate control, pressure sensitive adhesives, backing laminates, and protective drug release liners. In certain embodiments, the polymers in transdermal patch are biocompatible with the skin to provide a constant and effectual supply of the drug (ketoprofen/dexketoprofen-lidocaine AF) throughout the drug delivery period. In certain embodiments, the polymers used in transdermal patch formulations comprise polyethylene glycol (PEG), methacrylate copolymers (e.g., Eudragit E 100, Eudragit RS PO and Eudragit RL PO. Eudragit NE 40 D), cellulose derivatives (along with polyvinylpyrrolidone (PVP) and dibutyl phthalate as a plasticizer, hydroxypropyl methylcellulose (HPMC), and mixtures thereof.

In certain embodiments, the ketoprofen/dexketoprofen-lidocaine AF is formulated as a transdermal patch formulation comprising pressure-sensitive adhesives (PSA) selected from the group comprising natural rubber, acrylics, thermoplastic elastomers, polyisobutylene, and silicone-based adhesives. Adhesive characteristics of the transdermal patch are crucial to transdermal devices. There should be a complete and intimate contact between the patch and skin surface for efficient delivery of the drug. PSAs adhere to the skin with no more than applied finger pressure, they are aggressively and permanently sticky, they exert a strong holding force, and they can be removed from a smooth surface without leaving a residue. Common adhesives used in transdermal patches are polyisobutylene, acrylic, and silicone based.

In certain embodiments, the transdermal patches of the disclosure are partially or completely covered with a rate controlling membrane to control the release of the ketoprofen/dexketoprofen-lidocaine AF. In certain embodiments, the rate controlling membrane comprises polypropylene, polyethylene, polyurethane, and ethylene vinyl acetate (EVA) polymer. In certain embodiments, permeability of the rate controlling membrane can be altered by adjusting the percentage of vinyl acetate in the EVA polymer. In certain embodiments, permeability of the rate controlling membrane is improved with addition of urethane polymer to the rate controlling EVA polymer.

In certain embodiments, the transdermal patch is partially or completely covered with a release liner that is removed immediately before the patch is applied to the skin. In certain embodiments, the release liner comprises silicone-coated polyester film, silicone-coated paper, polyethylene, polypropylene fluorpolymers, fluoroolefin-based polymers, linear fluoroacrylates, or mixtures thereof.

In certain embodiments, the transdermal patch comprises a backing laminate that is chemically resistant and inert to other constituents in the delivery system. In certain embodiments, the backing laminate comprises silicone oil, EVA, Polyisobutylene, or 3M Scotchpak® 1006.

In certain embodiments, the transdermal patch comprises permeation enhancer comprising alcohol, propylene glycol, terpenes, sulfoxides, pyrrolidones, laurocapram, fatty acids, alcohols, fatty alcohols, surfactants, glycols, urea, bile salts, or mixtures thereof.

Methods of Treatment

In certain embodiments, the disclosure provides for methods for relieving pain in a patient suffering from osteoarthritis, rheumatoid arthritis, and related conditions characterized by painful and swollen joints, e.g., finger, wrist, hand, foot, ankle, knee, elbow, and other joint inflammation and pain, the method comprising topical administration of compositions comprising ketoprofen/dexketoprofen-lidocaine AF dispersed or dissolved in a suitable vehicle, and, optionally, lidocaine free base. In certain embodiments, the topical composition is a solution spray, solution, roll-on, drops, gel, cream, lotion, liposomes, nanosomes, transfersomes, ethosomes, emulgels, polyaphron dispersions, topical foam with propellant or propellant free air-spray pump, topical propellant-based sprays, and a transdermal patch, and optionally, lidocaine free base, dispersed or dissolved in a suitable vehicle.

In certain embodiments, the disclosure provides for method for relieving pain in a patient suffering from musculoskeletal pain, the method comprising topical administration of compositions comprising ketoprofen/dexketoprofen-lidocaine AF, and, optionally, lidocaine free base, dispersed or dissolved in a suitable vehicle. In certain embodiments, the topical composition is a solution, spray, foam, or a patch comprising a ketoprofen/dexketoprofen-lidocaine AF dispersed or dissolved in a suitable vehicle.

In certain embodiments, the disclosure provides for method for relieving pain in a patient suffering from joint pain, the method comprising topical administration of compositions comprising ketoprofen/dexketoprofen-lidocaine AF, and, optionally, lidocaine free base, dispersed or dissolved in a suitable vehicle. In certain embodiments, the topical composition is a solution, spray, foam, or a patch comprising a ketoprofen/dexketoprofen-lidocaine AF dispersed or dissolved in a suitable vehicle.

In certain embodiments, the disclosure provides for method for relieving pain in a patient suffering from ankylosing spondylitis, the method comprising topical administration of compositions comprising ketoprofen/dexketoprofen-lidocaine AF, and, optionally, lidocaine free base, dispersed or dissolved in a suitable vehicle. In certain embodiments, the topical composition is a solution, spray, foam, or a patch comprising a ketoprofen/dexketoprofen-lidocaine AF dispersed or dissolved in a suitable vehicle.

In certain embodiments, the disclosure provides for method for relieving pain in a patient suffering from acute pain caused by minor strains, sprains, bruises, the method comprising topical administration of compositions comprising ketoprofen/dexketoprofen-lidocaine AF, and, optionally, lidocaine free base, dispersed or dissolved in a suitable vehicle.

In certain embodiments, the topical composition is a solution, spray, foam, or a patch comprising a dexketoprofen-lidocaine AF dispersed or dissolved in a suitable vehicle.

In certain embodiments, the disclosure provides methods for treating patients with localized pain, e.g., neurological pain, skeletal-muscle pain, back pain, joint pain, pain associated with herpes infection, pain associated with itching and insect bites, and wound pain, e.g., sunburn pain, hemorrhoids, or pain from an injury, the method comprising topical administration of compositions comprising ketoprofen/dexketoprofen-lidocaine AF, and, optionally, lidocaine free base, dispersed or dissolved in a suitable vehicle. In certain embodiments, the topical composition is a solution, spray, foam, or a patch comprising a ketoprofen/dexketoprofen-lidocaine AF dispersed or dissolved in a suitable vehicle.

In certain embodiments, the ketoprofen/dexketoprofen-lidocaine AF enhances solubility and permeation of the ketoprofen/dexketoprofen and the lidocaine, when used in topical treatments, e.g., solutions, sprays, foams, and patches.

In certain embodiments, the ketoprofen/dexketoprofen-lidocaine AF, alone or dispersed or dissolved in a suitable vehicle on topical administration to a subject exhibits flip-flop pharmacokinetics with zero order absorption and first order elimination of the two drugs, thereby resulting in an extended drug delivery and providing plasma levels of dexketoprofen up to about 96 hours and lidocaine up to about 72 hours. In certain embodiments, the ketoprofen/dexketoprofen-lidocaine AF, alone or dispersed or dissolved in a suitable vehicle, on administration to a human subject provides a ketoprofen/dexketoprofen Tmax of from about 20 hrs, about 21 hrs, about 22 hrs, about 23 hrs, about 24 hrs, about 25 hrs, about 26 hrs, about 27 hrs, about 28 hrs, or intermediate periods therein. In certain embodiments, the ketoprofen/dexketoprofen-lidocaine AF, alone or dispersed or dissolved in a suitable vehicle, on topical administration to a subject provides a lidocaine Tmax of from about 20 hrs, about hrs, about 22 hrs, about 23 hrs, about 24 hrs, about 25 hrs, about 26 hrs, about 27 hrs, about 28 hrs, or intermediate periods therein.

In certain embodiments, the novel ketoprofen/dexketoprofen-lidocaine AF, dispersed or dissolved in a suitable vehicle, when topically administered to a subject prolongs plasma level of the ketoprofen/dexketoprofen for up to about 96 hours and prolongs plasma level of the lidocaine for up to about 72 hours.

Dosage and Administration

In certain embodiments, the topical spray solution delivers a dexketoprofen dose/spray of from about 0.05 mg/cm$^2$ to 4 mg/cm.$^2$. In certain embodiments, the topical spray solution deliver a dexketoprofen dose of about 0.05 mg/cm$^2$, about 0.1 mg/cm$^2$, about 0.15 mg/cm$^2$, about 0.2 mg/cm$^2$, about 0.25 mg/cm$^2$, about 0.3 mg/cm$^2$, about 0.35 mg/cm$^2$, about 0.4 mg/cm$^2$, about 0.45 mg/cm$^2$, about 0.5 mg/cm$^2$, about 0.55 mg/cm$^2$, about 0.6 mg/cm$^2$, about 0.65 mg/cm$^2$, about 0.7 mg/cm$^2$, about 0.75 mg/cm$^2$, about 0.8 mg/cm$^2$, about 0.85 mg/cm$^2$, about 0.9 mg/cm$^2$, about 0.95 mg/cm$^2$, about 1 mg/cm$^2$, about 1.5 mg/cm$^2$, about 2 mg/cm$^2$, about 2.5 mg/cm$^2$, about 3 mg/cm$^2$, about 3.5 mg/cm$^2$, about 4 mg/cm$^2$ or intermediate values therein. In certain embodiments, the topical spray solution delivers a dexketoprofen dose of about 0.25 mg/cm.$^2$ In certain embodiments, each spray volume is from about 75 µL to about 200 µL. In certain embodiments, each spray volume is about 75 µL, about 100 µL, about 105 µL, about 110 µL, about 115 µL, about 120 µL, about 125 µL, about 130 µL, about 135 µL, about 140 µL, about 145 µL, about 150 µL, about 175 µL, about 200 µL, or intermediate volumes therein. In certain embodiments, each spray volume is about 130 µL.

In certain embodiments, the topical spray solution delivers a lidocaine dose/spray of from about 0.05 mg/cm$^2$ to about 4 mg/cm.$^2$. In certain embodiments, the topical spray solution deliver a dexketoprofen dose of about 0.05 mg/cm$^2$, about 0.1 mg/cm$^2$, about 0.15 mg/cm$^2$, about 0.2 mg/cm$^2$, about 0.25 mg/cm$^2$, about 0.3 mg/cm$^2$, about 0.35 mg/cm$^2$, about 0.4 mg/cm$^2$, about 0.45 mg/cm$^2$, about 0.5 mg/cm$^2$, about 0.55 mg/cm$^2$, about 0.6 mg/cm$^2$, about 0.65 mg/cm$^2$, about 0.7 mg/cm$^2$, about 0.75 mg/cm$^2$, about 0.8 mg/cm$^2$, about 0.85 mg/cm$^2$, about 0.9 mg/cm$^2$, about 0.95 mg/cm$^2$, about 1 mg/cm$^2$, about 1.5 mg/cm$^2$, about 2 mg/cm$^2$, about 2.5 mg/cm$^2$, about 3 mg/cm$^2$, about 3.5 mg/cm$^2$, about 4 mg/cm$^2$ or intermediate values therein. In certain embodiments, the topical spray solution delivers a lidocaine dose of about 0.5 mg/cm.$^2$ In certain embodiments, each spray volume is from about 75 µL to about 200 µL. In certain embodiments, each spray volume is about 75 µL, about 100 µL, about 105 µL, about 110 µL, about 115 µL, about 120 µL, about 125 µL, about 130 µL, about 135 µL, about 140 µL, about 145 µL, about 150 µL, about 175 µL, about 200 µL, or intermediate volumes therein. In certain embodiments, each spray volume is about 130 µL.

Methods of Manufacture of Dexketoprofen-Lidocaine Associated Form

In certain embodiments, the disclosure provides methods for making ketoprofen/dexketoprofen-lidocaine AF useful for treating localized pain and inflammation.

In certain embodiments, the ketoprofen/dexketoprofen-lidocaine AF is prepared by triturating/grinding ketoprofen/dexketoprofen free acid and lidocaine free base using a pestle and mortar or other mechanical means of providing pressure and/or grinding to obtain the ketoprofen/dexketoprofen-lidocaine AF as a viscous liquid.

In certain embodiments, the ketoprofen/dexketoprofen-lidocaine AF is prepared by heating dexketoprofen free acid and lidocaine free base mixture into a melt, and cooling the mixture to obtain the ketoprofen/dexketoprofen-lidocaine AF as a viscous liquid.

In certain embodiments, the ketoprofen/dexketoprofen-lidocaine AF is prepared by dissolving dexketoprofen free acid and lidocaine free base in acetone or other volatile solvents, followed by evaporating the acetone or volatile solvent to obtain the ketoprofen/dexketoprofen-lidocaine AF as a viscous liquid.

In certain embodiments, the ketoprofen/dexketoprofen-lidocaine AF is formed in situ in the topical composition. The method comprises individually dissolving the ketoprofen/dexketoprofen free acid and lidocaine free base in a solvent vehicle to obtain a solution; and mixing the said solution with a topical vehicle to obtain a topical composition. In certain embodiments, the vehicle further comprises an emulsifier/surfactant, a permeation enhancer, an antimicrobial preservative, and/or a humectant//emollient.

In certain embodiments, the ketoprofen/dexketoprofen-lidocaine AF comprise ketoprofen/dexketoprofen free acid and lidocaine free base in a molar ratio of 1:1. In certain embodiments, the ketoprofen/dexketoprofen-lidocaine AF comprise ketoprofen/dexketoprofen and lidocaine in a weight ratio of 1:1.

Methods for Making Topical Compositions

In certain embodiments, the disclosure provides methods for making topical roll-on, dropper, gel, foam or spray compositions comprising ketoprofen/dexketoprofen-lidocaine AF in a non-aqueous solution. In certain embodiments the method comprises mixing the ketoprofen/dexketoprofen-lidocaine AF in a non-aqueous vehicle comprising an antimicrobial preservative, an antioxidant, a permeation enhancer, a structure modifier, a solvent, a humectant/emollient, and/or mixtures thereof to provide a rapid drying non-aqueous solution that is filled into a bottle with a dropper, roll-on, or a pump/spray device. In certain embodiments, the solutions are dispersed as gels using collapsible tube or pump device.

In certain embodiments, the disclosure provides methods for making topical roll-on, dropper, gel, foam or spray compositions comprising ketoprofen/dexketoprofen-lidocaine AF, optionally, along with free lidocaine in a non-aqueous solution. In certain embodiments the method comprises mixing the ketoprofen/dexketoprofen free acid and lidocaine free base in a dexketoprofen free acid:lidocaine free base molar ratio of from about 1:1 to about 1:5 in a non-aqueous vehicle comprising an antimicrobial preservative, an antioxidant, a permeation enhancer, a structure modifier, a solvent, a humectant/emollient, and/or mixtures thereof to provide a rapid drying non-aqueous solution that is filled into a bottle with a dropper, roll-on, or a pump/spray device. In certain embodiments, the solutions are dispersed as gels using collapsible tube or pump device.

In certain embodiments, the disclosure provides topical foam compositions comprising ketoprofen/dexketoprofen-lidocaine AF, optionally, along with free lidocaine, dispersed or dissolved in a suitable vehicle comprising a solvent, emulsifier/surfactant, a permeation enhancer, antimicrobial preservative, antioxidant, chelating/metal sequestering agent, buffer and/or a humectant/emollient or mixtures thereof and is filled into a bottle or canister with a pump/spray device.

In certain embodiments, the disclosure provides methods for making topical propellant spray compositions comprising ketoprofen/dexketoprofen-lidocaine AF. In certain embodiments, the method comprises mixing the ketoprofen/dexketoprofen free acid and lidocaine free base in a dexketoprofen free acid:lidocaine free base molar ratio of from about 1:1 to about 1:5 with a vehicle comprising an emulsifying agent/surfactant, a permeation enhancer, a antimicrobial preservative, and/or a humectant/emollient; and an aerosol in a stainless steel vessel to obtain a uniform dispersion; homogenizing the dispersion, if necessary, to form a fine dispersion and filling the homogenized fine dispersion into an aerosol device comprising metal canisters with aerosol valve assembly; sealing the device via crimping; adding propellants to the device through aerosol valve to required fill content, and placing actuator on the sealed canister with valve.

In certain embodiments, the disclosure provides a method for making topical transdermal patch composition comprising ketoprofen/dexketoprofen-lidocaine AF. In certain embodiments, the method comprises: dissolving ketoprofen/dexketoprofen-lidocaine AF and, optionally, lidocaine free base, in a suitable solvent (e.g., ethanol or isopropanol) to obtain a solution; dispersing the solution containing the ketoprofen/dexketoprofen-lidocaine AF, optionally, lidocaine free base, in a solution containing an acrylic pressure sensitive adhesive, a pressure sensitive silicone adhesive or in polyisobutylene (PIB) adhesive with homogenization to form a uniform dispersion or fine suspension, and coating the uniform dispersion or fine suspension onto an occlusive backing liner, and drying to remove the volatile solvents. In certain embodiments, a release liner may be placed on top of these layers to form a matrix adhesive patch.

EXAMPLES

The following examples illustrate the disclosure in a nonlimiting manner. Unless indicated to the contrary, the numerical parameters set forth herein can vary depending upon the desired properties sought to be obtained by the present disclosure.

Example 1: Preparation of Ketoprofen/Dexketoprofen-Lidocaine Associated Form

Dexketoprofen free acid and lidocaine free base (~1:1 weight ratio) were placed in a mortar and triturated/mixed using a pestle to obtain dexketoprofen-lidocaine AF as a viscous liquid.

Similar method can be used for making ketoprofen-lidocaine AF from ketoprofen free acid and lidocaine free base in ~1:1 molar ratio.

Figure 5:
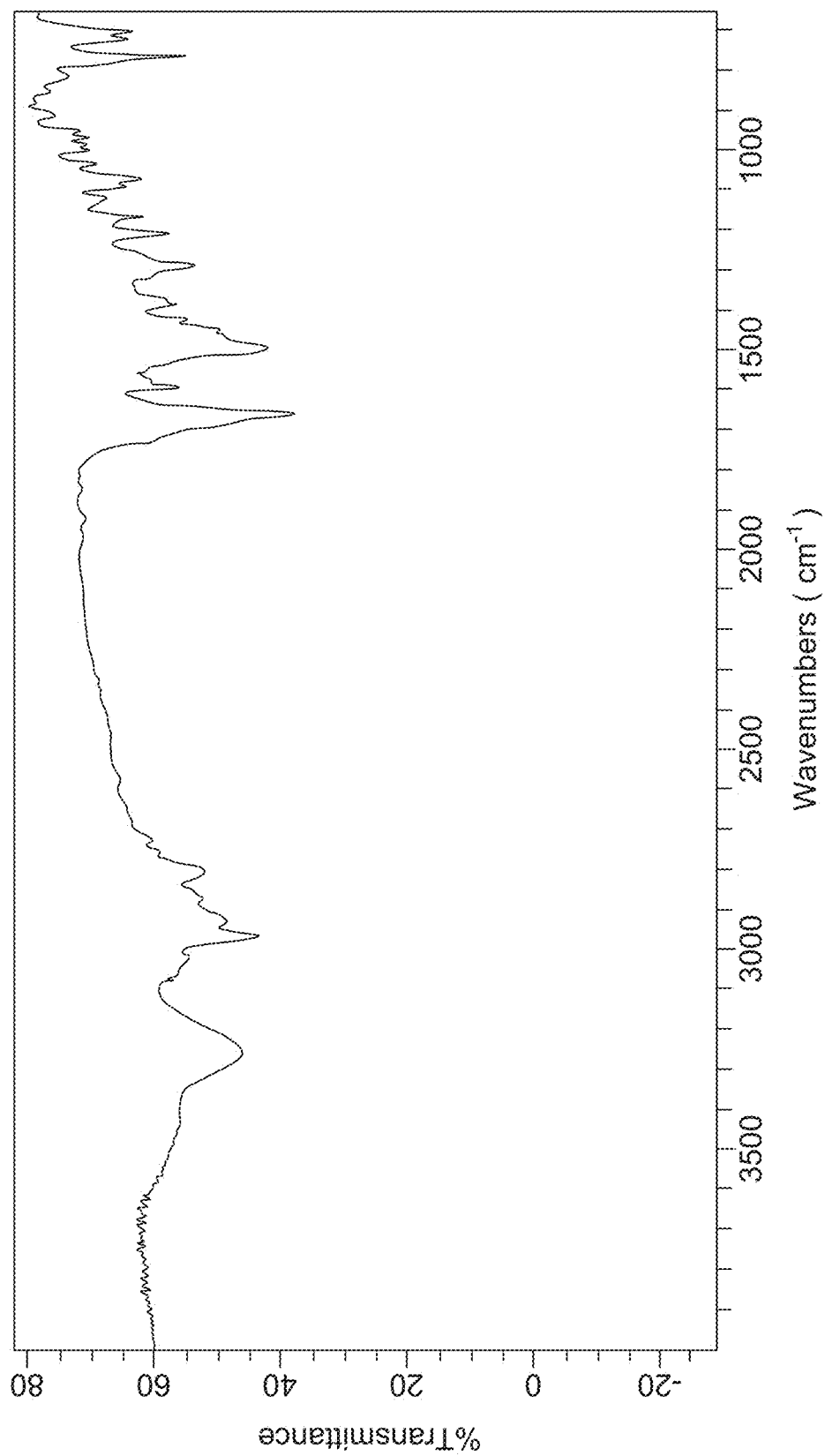
FIG. 5 shows IR spectrum of triturated/ground dexketoprofen free acid and lidocaine free base using FTIR. The 1729 cm$^{-1}$ peak identified in dexketoprofen free acid and broad peak between 2000 cm$^{-1}$ and 2800 cm$^{-1}$ associated with lidocaine amine salt were absent in the IR spectrum, thereby confirming the formation of dexketoprofen-lidocaine AF that is free of any ionic interaction (including any salt formation) between dexketoprofen acid group and lidocaine amine group.

FIG. 5 shows IR spectrum of triturated/ground dexketoprofen free acid and lidocaine free base using FT IR. The 1729 cm$^{-1}$ peak identified in dexketoprofen free acid and broad peak associated with lidocaine amine salt are absent in the IR spectrum, thereby confirming the formation of dexketoprofen-lidocaine AF that is free of any ionic interaction.

Example 2: Preparation of Ketoprofen/Dexketoprofen-Lidocaine Associated Form

Step 1: Dexketoprofen free acid and lidocaine free base (~1:1 weight ratio) were heated to about 70° C. to obtain a liquid melt.

Step 2: The liquid melt from Step 1 was cooled to room temperature to obtain dexketoprofen-lidocaine AF.

Similar method can be used for making ketoprofen-lidocaine AF from ketoprofen free acid and lidocaine free base in ~1:1 molar ratio.

FIG. 6 shows FTIR spectrum of dexketoprofen-lidocaine AF obtained by melting dexketoprofen free acid and lidocaine free base mixture, followed by cooling the mixture into a viscous liquid. The 1729 cm$^{-1}$ peak identified in dexketoprofen free acid and broad peak associated with lidocaine amine salt are absent in the IR spectrum, thereby confirming the formation of dexketoprofen-lidocaine AF that is free of any ionic interaction.

Example 3: Preparation of Ketoprofen/Dexketoprofen-Lidocaine Associated Form

Step 1: Dexketoprofen free acid and lidocaine free base (~1:1 weight ratio) were dissolved in acetone to obtain a clear solution.

Step 2: The clear solution from Step 1 was evaporated under vacuum to remove the acetone and obtain dexketoprofen-lidocaine AF as a viscous liquid.

Similar method can be used for making Ketoprofen-lidocaine AF from ketoprofen free acid and lidocaine free base in ~1:1 molar ratio.

FIG. 7 shows FTIR spectrum of dexketoprofen-lidocaine AF obtained after dissolving dexketoprofen free acid and lidocaine free base in acetone, followed by evaporating the acetone. The 1729 cm$^{-1}$ peak identified in dexketoprofen free acid and broad peak associated with lidocaine amine salt are absent in the IR spectrum, thereby confirming the formation of dexketoprofen-lidocaine AF that is free of any ionic interaction.

Example 4: Topical Solution Spray or Roll-on Compositions Comprising Ketoprofen/Dexketoprofen-Lidocaine Associated Form Table 4 provides Formulations 1-4 were prepared by the following general procedure.

Procedure:

Step 1: In a suitable vessel, PEG400 was added with continuous stirring, followed by the addition of cyclomethicone to obtain a liquid mixture.

Step 2: Ethanol/Isopropyl alcohol was added to the liquid mixture from Step 1 and mixed to form a homogeneous vehicle mixture.

Step 3: Ketoprofen/Dexketoprofen free acid and Lidocaine free base were dissolved in the vehicle mixture from Step 2 with continuous stirring to obtain a clear solution.

Step 4: The clear solution from step 4 was filled into a bottle with a dropper, roll-on cap or a pump/spray device closure.

TABLE 4

| Ingredients | Formulation 1 (% w/w) | Formulation 2 (% w/w) | Formulation 3 (% w/w) | Formulation 4 (% w/w) |
|---|---|---|---|---|
| Ketoprofen/Dexketoprofen, free acid | 14.71 | 14.71 | 15 | 15 |
| Lidocaine, free base | 14.71 | 29.4 | 30 | 30 |
| Ethanol | 33.17 | 33.17 | NA | NA |
| Isopropyl Alcohol | NA | NA | 20 | 33 |
| PEG 400 | 33.17 | 33.17 | 29 | 16 |
| Cyclomethicone | 4.24 | 4.24 | 6 | 6 |
| Total | 100 | 100 | 100 | 100 |

Example 5: Topical Solution Spray or Roll-on Compositions Comprising Ketoprofen/Dexketoprofen-Lidocaine Associated Form with Antioxidants Table 5 provides Formulation 5 prepared by the following general procedure.

Procedure:

Step 1: In a suitable vessel, appropriate amount of PEG400 is added and with continuous stirring, followed by the addition of cyclomethicone.

Step 2: Ethanol is added to the liquid mixture from Step 1 and mixed to form a homogeneous vehicle mixture.

Step 3: BHA or BHT, and EDTA are added to the homogeneous vehicle mixture from Step 2 to obtain to obtain a final vehicle for the solution composition.

Step 4: Ketoprofen/Dexketoprofen-lidocaine AF (Examples 1-3) and lidocaine free base is dissolved in the vehicle from Step 3 with continuous stirring to obtain a clear solution.

Step 5: The clear solution from step 4 is filled into a bottle with a dropper, roll-on cap or a pump/spray device closure.

TABLE 5

| Ingredients | Formulation 5 (% W/W) |
|---|---|
| Ketoprofen/Dexketoprofen-Lidocaine AF (1:1) | 1-40 |
| Lidocaine free base | 2-20 |
| Ethanol (absolute), PEG 400, Cyclomethicone (47:47:6) mixture | 30-60 |

TABLE 5-continued

| Ingredients | Formulation 5 (% W/W) |
|---|---|
| Butylated hydroxyanisole (BHA) | 0.02 |
| Butylated hydroxytoluene (BHT) | 0.1 |
| EDTA | 0.5 |

Example 6: Topical Propellant Spray Compositions Comprising Ketoprofen/Dexketoprofen-Lidocaine Associated Form Table 6 provides Formulation 6 prepared by the following general procedure.

TABLE 6

| Ingredients | Formulation 6 (% W/W) |
|---|---|
| Ketoprofen/Dexketoprofen-Lidocaine AF (1:1) | 4-40 |
| Lidocaine free base | 2-20 |
| Ethanol/Isopropanol | 10-30 |
| Isobutane | q.s. |
| Propane | q.s. |

Procedure:
1. Appropriate amounts of ketoprofen/dexketoprofen-lidocaine AF (Examples 1-3), free lidocaine and ethanol are dispensed into a stainless-steel vessel and mixed with homogenization to obtain a solution.
2. The solution from step 1 is filled into an aerosol device comprising aluminum canisters, with aerosol valve assembly placed on top after filling.
3. The aerosol device from Step 2 is sealed via crimping.
4. Propellant (mixture of propane and isobutane) is added to the aerosol device from Step through aerosol valve to required fill content, and actuator is placed on the sealed canister with valve.

Example 7: Topical Gel Comprising Ketoprofen/Dexketoprofen-Lidocaine Associated Form Table 7 provides Formulation 7 prepared by the following general procedure:

TABLE 7

| Ingredients | Formulation 7 (% W/W) |
|---|---|
| Ketoprofen/Dexketoprofen-Lidocaine AF (1:1) | 4-40 |
| Lidocaine free base | 2-20 |
| Lecithin | 1-2 |
| Tween 80 | 3-4 |
| Glycerin | 5-10 |
| HPMC or carbomer | 1-10 |
| Deionized Water | q.s |

Procedure:
Step 1: Glycerin and lecithin are added to a stainless-steel container and mixed with stirring.
Step 2: Ketoprofen/Dexketoprofen-Lidocaine AF is added to the stainless-steel container from Step 1 and stirred until a uniform dispersion is obtained.
Step 3: Tween 80 is added to the dispersion from step 2, with continuous mixing to obtain a uniform dispersion.

Step 4: Required amount of water is heated in a stainless-steel container to ~70° C.

Step 5: HPMC or Carbomer is added to the stainless-steel vessel from Step 4 and mixed until a clear, homogenous, viscous solution is formed.

Step 6: Solution from Step 5 is allowed to cool to room temperature with continuous stirring.

Step 7: Dispersion from Step 3 is added to the viscous liquid from Step 6, with continuous mixing, and homogenized for 5-10 min to obtain a uniform dispersion(gel).

Step 8: The gel obtained from Step 7 is filled into appropriate dispensers (e.g., collapsible tubes, bag-on-valve bottle/pump) and sealed.

Example 8: Membrane Moderated Transdermal Patch Comprising Ketoprofen/Dexketoprofen-Lidocaine Associated Form A transdermal patch containing a drug reservoir comprising ketoprofen/dexketoprofen-lidocaine AF, a backing layer made of impermeable metallic plastic laminate, and a porous polymeric membrane comprising a polymer matrix that controls drug release over time is made, wherein the membrane is made of polymeric materials (e.g., hypoallergenic adhesive polymer, e.g., ethylene vinyl acetate copolymer or polypropylene). Release of the ketoprofen/dexketoprofen-lidocaine AF in the transdermal patch is controlled by the formation of molecular dispersion of the drug in the polymer matrix comprising a polymer selected from the group comprising hydroxypropyl methylcellulose (HPMC), silicone elastomers (MDX4-421), ethyl cellulose, HPMC/Chitosan, HPMC/microcrystalline cellulose (MC)/polyvinylpyrrolidone (PVP).

Example 9: Micro-Reservoir Transdermal Patch Comprising Mixture

A micro-reservoir transdermal patch combining matrix dispersion with a drug reservoir comprising the ketoprofen/dexketoprofen-lidocaine AF, and, optionally, lidocaine free base is made. The reservoir is prepared by dispersing/suspending the drug (ketoprofen/dexketoprofen-lidocaine AF and, optionally, lidocaine free base) in an aqueous solution of hydrophilic polymer to obtain a drug suspension, then homogeneously dispersing the drug suspension in a hydrophilic matrix like lactose, silicon dioxide, or silicone medical fluid. Dispersion is carried out with a high shear mechanical force, which results in the formation of thousands of microscopic, unleachable spheres. Crosslinking polymeric agents are usually added, since the drug dispersion needs to be thermodynamically stable.

Example 10: Matrix Transdermal Patch (Drug-in-Adhesive) Comprising Mixture

A single layer or multilayer transdermal patch comprising a drug reservoir is designed to distribute the drug (ketoprofen/dexketoprofen-lidocaine AF, and, optionally, lidocaine free base) on an adhesive polymer such as in an acrylic-based polymer adhesive. This drug-polymer matrix is placed onto an impermeable backing layer either by solvent casting or by melting the adhesive polymeric materials.

Example 11: Matrix Transdermal Patch (Matrix Dispersion) Comprising Mixture

A matrix transdermal patch comprising a reservoir comprising a hydrophilic or lipophilic polymer matrix and a drug (ketoprofen/dexketoprofen-lidocaine AF, and, optionally, lidocaine free base) homogenously dispersed in the matrix is made by placing the drug-polymer matrix over a plate with an impermeable laminate backing.

Example 12: Topical Foam (Non-Propellant)

Various topical foams containing ketoprofen/dexketoprofen-lidocaine AF, solvents (optionally cosolvents), and excipients selected from the group comprising surface active agents and viscosity-modifying agents are provided below. In certain embodiments, the foam composition further comprises lidocaine free base.

1. Ketoprofen/Dexketoprofen-lidocaine AF (from examples 1-3). and a hydroethanolic foam vehicle comprising cetyl alcohol, citric acid, ethanol (60%), polysorbate 60, potassium citrate, propylene glycol, purified water, stearyl alcohol, and mixtures thereof. In certain embodiments, the composition further comprises lidocaine free base.

2. Ketoprofen/Dexketoprofen-lidocaine AF (from examples 1-3), anhydrous citric acid, cetyl alcohol, cyclomethicone, glycerin, isopropyl myristate, polyoxyl 20 cetostearyl ether, potassium citrate monohydrate, propylene glycol, purified water, sorbitan monolaurate, and phenoxyethanol. In certain embodiments, the composition further comprises lidocaine free base.

3. Ketoprofen/Dexketoprofen-lidocaine AF (from examples 1-3), BHT, cetyl alcohol, citric acid, dehydrated alcohol, isobutane, lactic acid, polysorbate 60, purified water, stearyl alcohol In certain embodiments, the composition further comprises lidocaine free base.

Example 13: Bioavailability of Topical Dexketoprofen-Lidocaine Formulations

An open label, single period, single topical spray dose (0.25 mg/cm$^2$) bioavailability of Formulation 1 dexketoprofen-lidocaine topical spray in healthy, adult male human subjects was conducted to evaluate pharmacokinetics and bioavailability of dexketoprofen and lidocaine in plasma as an indicator of skin permeability and absorption.

Pharmacokinetic parameters of Dexketoprofen are summarized below in Table 8.

TABLE 8

|  | $T_{max}$ (hrs) | $C_{max}$ (ng/ml) | $AUC_{last}$ |
|---|---|---|---|
| Mean | 27.328 | 24.126 | 749.250 |
| SD | 9.9100 | 19.1916 | 508.398 |
| Min | 16.00 | 7.714 | 265.426 |
| Median | 24.000 | 8.069 | 541.326 |
| Max | 48.400 | 74.511 | 1704.093 |
| CV % | 36.3 | 79.5 | 67.9 |
| Geometric Mean | 26.041 | 18.905 | 612.136 |

Pharmacokinetic parameters of Lidocaine are summarized below in Table 9.

TABLE 9

|  | $T_{max}$ (hrs) | $C_{max}$ (ng/mL) | $AUC_{last}$ |
|---|---|---|---|
| Mean | 21.000 | 10.170 | 247.015 |
| SD | 4.5527 | 7.7904 | 183.6385 |
| Min | 12.000 | 3.500 | 111.652 |
| Median | 24.000 | 8.069 | 196.682 |
| Max | 24.000 | 33.128 | 792.670 |

TABLE 9-continued

|  | $T_{max}$ (hrs) | $C_{max}$ (ng/mL) | $AUC_{last}$ |
|---|---|---|---|
| CV % | 21.7 | 76.6 | 74.3 |
| Geometric Mean | 20.469 | 8.527 | 210.705 |

Data from Tables 8 and 9 shows that Formulation 1 provides prolonged absorption of dexketoprofen and lidocaine with a mean Tmax for dexketoprofen from about 17 to about 37 hours and lidocaine of from about 16 to about 26 hours. Quantifiable plasma levels of dexketoprofen were observed within about 2 hrs of application, and of lidocaine within about 3 hours of application. The observed flip-flop pharmacokinetics was unexpected and a surprise. The pharmacokinetic data showed a zero-order absorption and first-order elimination for both drugs. Based on the AUC values, both drugs are bioavailable in significant amounts in plasma.

FIG. 14 provides mean plasma cone vs. time curve for lidocaine.

FIG. 15 provides mean plasma concentration vs. time curve for dexketoprofen.

Lidocaine mean Tax of from about 16 to about 26 hours obtained from the AF formulation, is substantially longer than lidocaine mean $T_{max}$ of about 2 to 4 hours from topical administration of marketed topical lidocaine compositions. Similarly, dexketoprofen mean Tmax for dexketoprofen from about 17 to about 37 hours is obtained from this AF formulation. However, dexketoprofen $T_{max}$ from oral delivery is only about 15-45 minutes. This delay in lidocaine and dexketoprofen median Tmax from Formulation 1 indicates that the dexketoprofen-lidocaine drug-drug association is controlling the delivery of dexketoprofen and lidocaine from the AF. The dexketoprofen-lidocaine AF is acting as an extended-release drug delivery system, e.g., drug-drug association itself is extending the drug delivery without the need of any excipient for extending and/or controlling the drug release. The plasma levels of both lidocaine and dexketoprofen are significantly prolonged due to such extended release of the two drugs from the dexketoprofen-lidocaine AF. For example, for lidocaine, the 48 h plasma level is 2-fold greater than the 6 h plasma level. Similarly, for dexketoprofen, the 48 h plasma level is 3-fold greater than the 6 h plasma level.

Example 14: Stability of Dexketoprofen-Lidocaine Associated Forms Under Ambient Conditions Spray formulation 1 was stored under ambient conditions at 15-30° C./60% RH.

Figure 11:
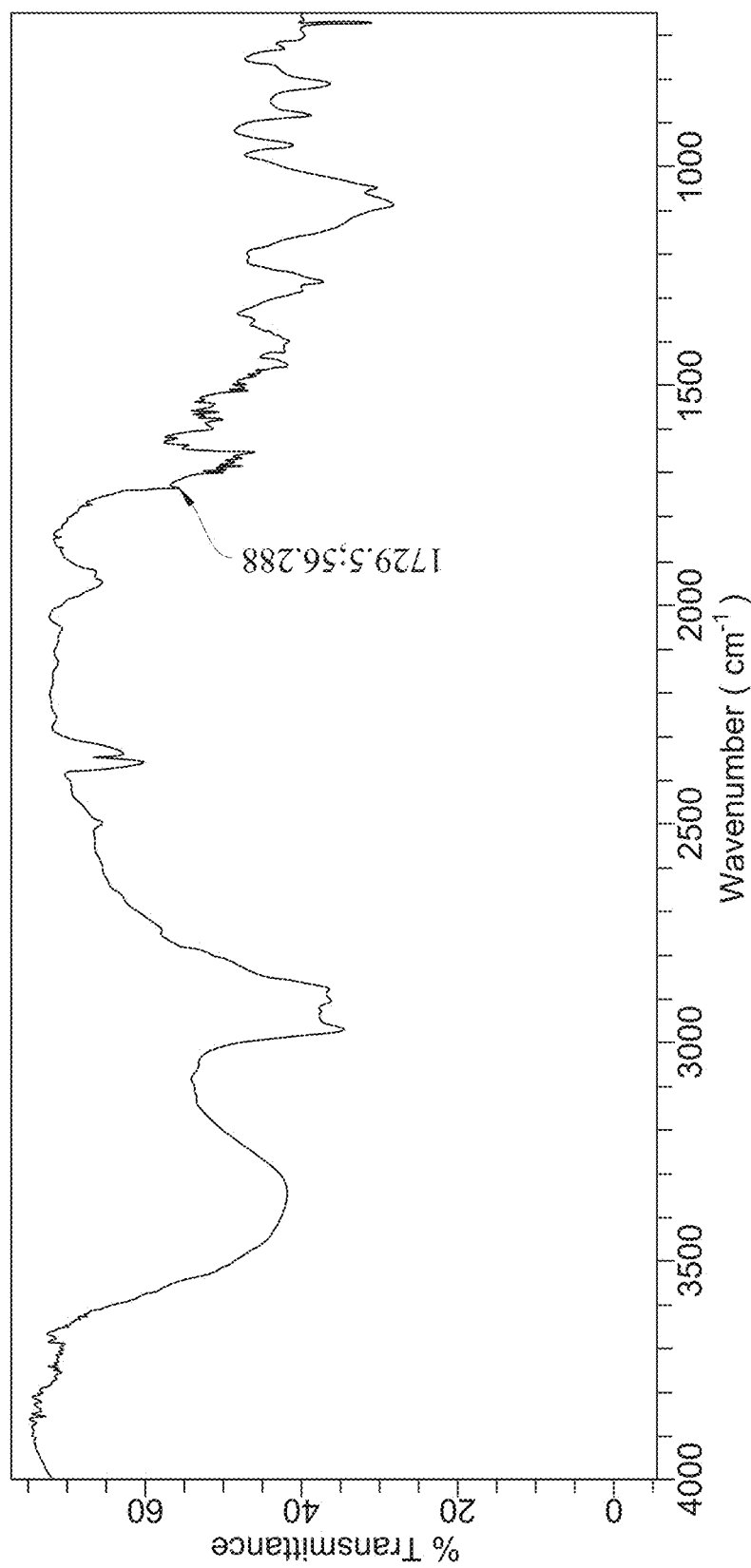
FIG. 11 shows IR spectrum using FTIR of spray Formulation 1 containing in situ formed dexketoprofen-lidocaine AF after one year storage under ambient conditions (15-30° C.). The spray formulation was obtained by adding the dexketoprofen free acid and lidocaine free base to the vehicle of the spray formulation. The 1729 cm$^{-1}$ peak identified in dexketoprofen free acid had minimal increase in % transmittance after one year storage under ambient storage conditions; and broad peak between 2000 cm$^{-1}$ and 2800 cm$^{-1}$ associated with lidocaine amine salt was absent in the IR spectrum, thereby confirming that the AF was stable under ambient conditions for about one year.
Figure 12:
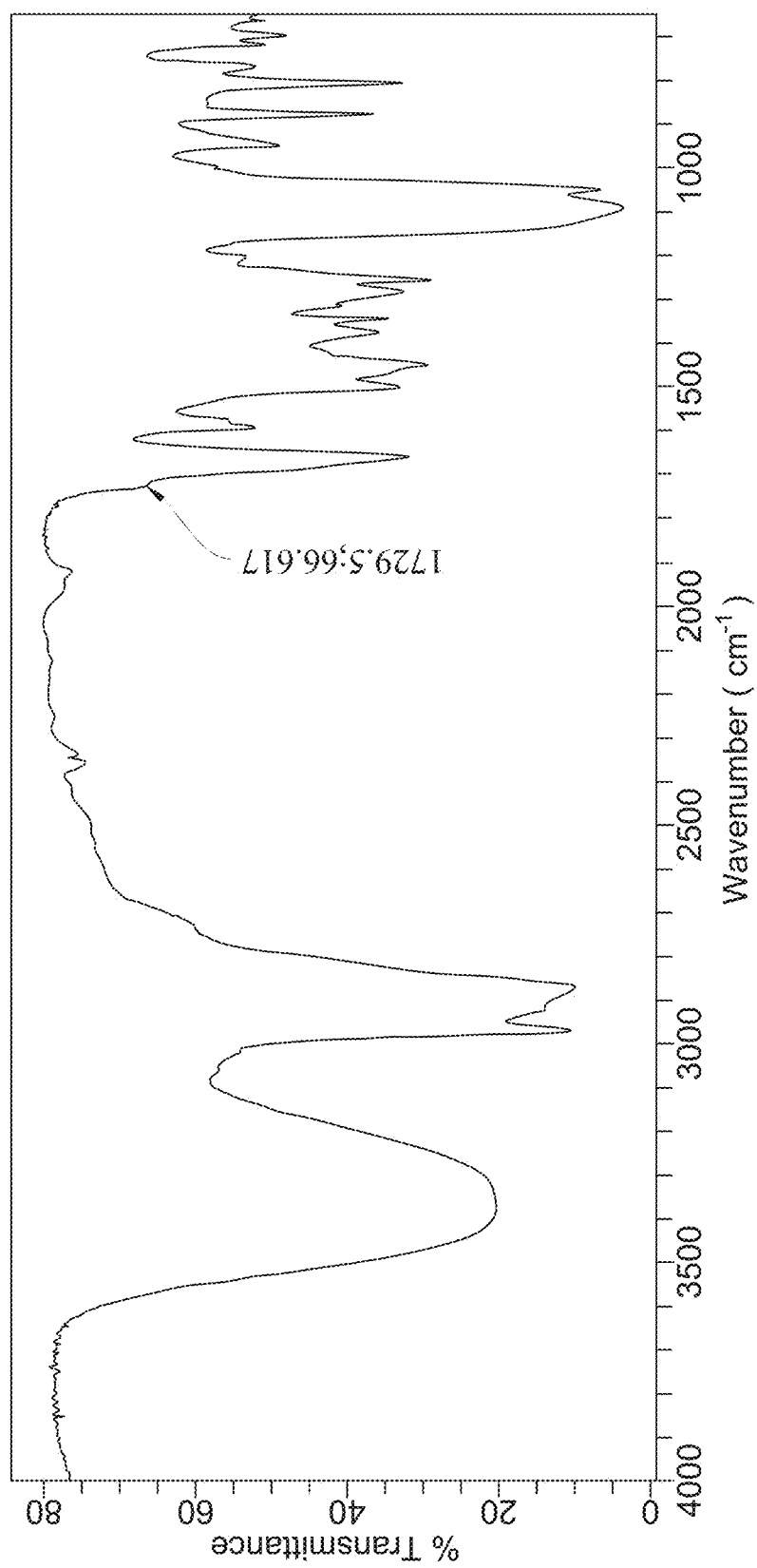
FIG. 12 shows FTIR spectrum of spray Formulation 2 containing in situ formed dexketoprofen-lidocaine AF. The spray formulation was obtained by adding the dexketoprofen free acid and lidocaine free base to the vehicle of the spray formulation. The 1729 cm$^{-1}$ peak identified in dexketoprofen free acid had minimal % transmittance; and broad peak between 2000 cm$^{-1}$ and 2800 cm$^{-1}$ associated with lidocaine amine salt was absent in the FTIR spectrum, thereby confirming that the AF was being formed.
Figure 13:
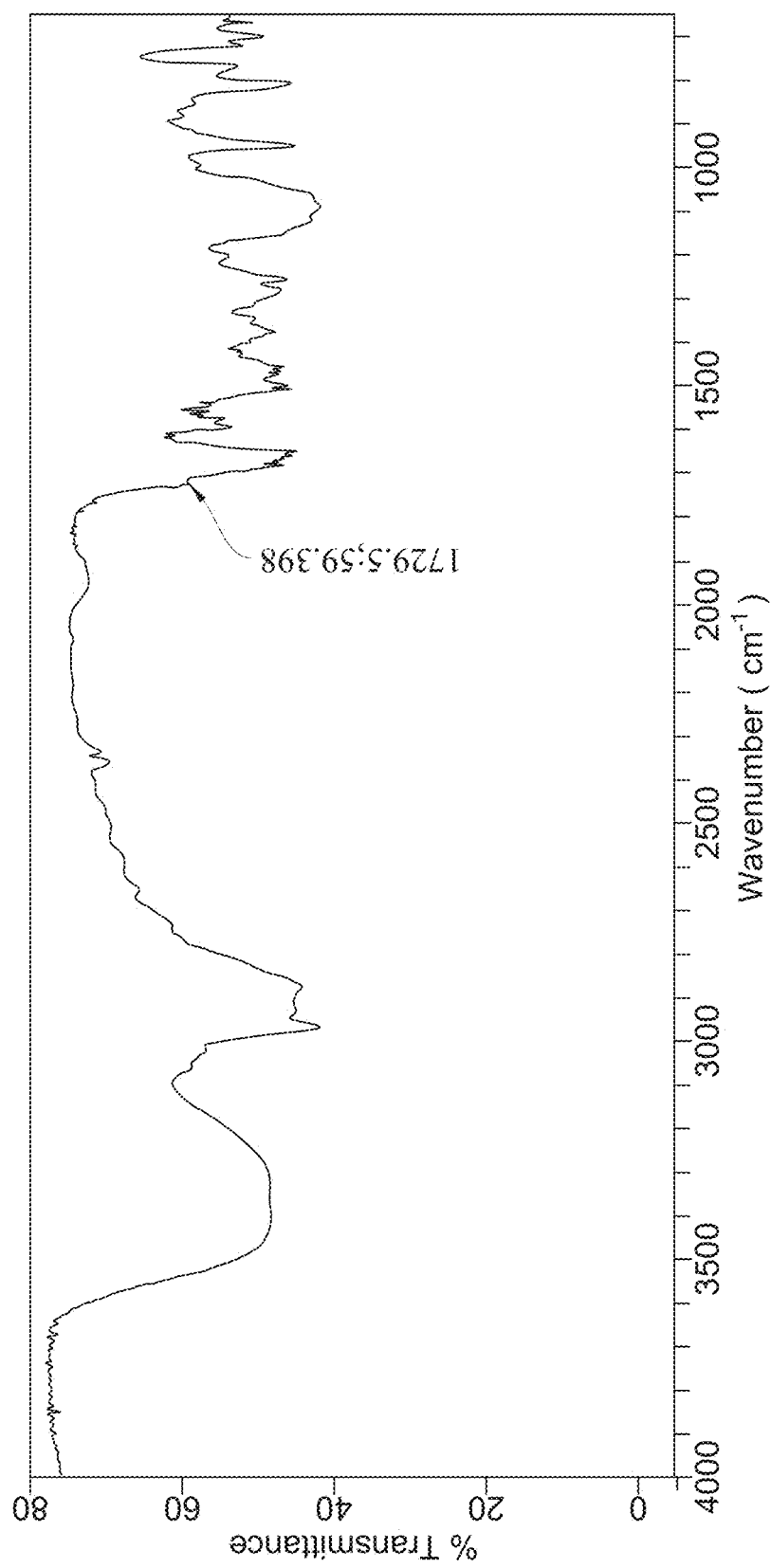
FIG. 13 shows FTIR spectrum of spray Formulation 3 containing in situ formed dexketoprofen-lidocaine AF. The spray formulation was obtained by adding the dexketoprofen free acid and lidocaine free base to the vehicle of the spray formulation. The 1729 cm$^{-1}$ peak identified in dexketoprofen free acid had minimal % transmittance; and broad peak between 2000 cm$^{-1}$ and 2800 cm$^{-1}$ associated with lidocaine amine salt was absent in the IR spectrum, thereby confirming that the AF was being formed.

FIG. 11 shows IR spectrum using FTIR of spray Formulation 1 containing in situ formed dexketoprofen-lidocaine AF (1:1 dexketoprofen:lidocaine weight ratio) after one year storage under ambient conditions. FIG. 11 shows that the 1729 cm$^{-1}$ peak identified in dexketoprofen free acid had minimal increase in % transmittance after one year storage under ambient storage conditions; and broad peak between 2000 cm$^{-1}$ and 2800 cm$^{-1}$ associated with lidocaine amine salt was absent in the IR spectrum, thereby confirming that the AF was stable (remained in AF) under ambient conditions for about one year. The one-year room temperature association stability of the dexketoprofen-lidocaine AF in the ethanol-PEG 400 solution was surprising and unanticipated.

Example 15: Storage Stability of Lidocaine and Dexketoprofen in Dexketoprofen-Lidocaine Associated Form Solution at 25° C./60% RH Storage stability of Formulation 1 containing Dexketoprofen-Lidocaine AF was determined at 25° C.±2° C./60% RH.

Table 10 provides 6 month storage stability of Formulation 1.

TABLE 10

|  | Initial | 1M | 3M | 6M |
|---|---|---|---|---|
| Lidocaine |  |  |  |  |
| Assay (% w/w) | 99.6 | 98.7 | 99.0 | 99.2 |
| Dexketoprofen |  |  |  |  |
| Assay (% w/w) | 103.8 | 101.7 | 100 | 99.2 |

Data from Table 10 clearly demonstrates that the dexketoprofen-lidocaine AF in Formulation 1 provides excellent storage stability of dexketoprofen free acid and lidocaine free base at 25° C.±2° C./60% RH.

The invention claimed is:

1. A dexketoprofen-lidocaine associated form comprising a dexketoprofen component and a lidocaine component; wherein the dexketoprofen component is a dexketoprofen free acid and the lidocaine component is a lidocaine free base;
   wherein the dexketoprofen component and the lidocaine component are present in 1:1 wt ratio;
   wherein the associated form does not include a covalent bond or an ionic bond between the dexketoprofen free acid and the lidocaine free base; wherein the associated form when subjected to characterization using infrared spectrum (IR) is missing IR peak at 1729 cm$^{-1}$ and is missing a broad IR peak between 2000-2800 cm$^{-1}$ wherein the IR peak at 1729 cm$^{-1}$ represents —C═O stretching vibration of the acid group in the dexketoprofen free acid and the broad peak between 2000-2800 cm$^{-1}$ represents peak associated with salt formation between the dexketoprofen free acid and the lidocaine free base;
   wherein the associated form provides extended release of the dexketoprofen free acid and the lidocaine free base; and
   wherein the associated form on topical administration to a subject provides a mean Tmax range for dexketoprofen of from about 17 hours to about 37 hours.

2. The dexketoprofen-lidocaine associated form of claim 1, wherein the associated form does not include any excipient to extend the release of the dexketoprofen free acid and the lidocaine free base.

3. The dexketoprofen-lidocaine associated form of claim 1, wherein the dexketoprofen free acid includes dexketoprofen in free acid form and does not include dexketoprofen salt; and the lidocaine free base includes lidocaine in free base form and does not include lidocaine salt.

4. The dexketoprofen-lidocaine associated form of claim 1, wherein the associated form has different physical characteristics as compared to dexketoprofen free acid or a salt thereof and lidocaine free base or a salt thereof; and wherein the physical characteristics include physical appearance, density, viscosity, specific gravity, color, and/or clarity.

5. The dexketoprofen-lidocaine associated form of claim 1, wherein the associated form includes association of acid group of dexketoprofen free acid and amide group of lidocaine free base.

6. The dexketoprofen-lidocaine associated form of claim 1, wherein the associated form on topical administration to a subject provides a mean Tmax range for lidocaine of from about 16 hours to about 26 hours.

7. The dexketoprofen-lidocaine associated form of claim 1, wherein the associated form on topical administration to a subject provides prolonged plasma level of dexketoprofen of up to about 96 hours and a prolonged plasma level of lidocaine of up to about 72 hours.

8. A pharmaceutical solution composition suitable for topical administration comprising a dexketoprofen-lidocaine associated form; and a vehicle selected from the group consisting of a monovalent alcohol, a divalent alcohol, a trivalent alcohol, dimethyl sulfoxide, triacetin, propylene carbonate, and mixtures thereof,
wherein the associated form contains dexketoprofen free acid and lidocaine free base in 1:1 weight ratio;
wherein the associated form does not include a covalent bond or an ionic bond between the dexketoprofen free acid and the lidocaine free base;
wherein the associated form when subjected to characterization using infrared spectrum (IR) is missing IR peak at 1729 cm$^{-1}$ and is missing a broad IR peak between 2000-2800 cm$^{-1}$, wherein the IR peak at 1729 cm$^{-1}$ represents —C═O stretching vibration of acid group in dexketoprofen and the broad peak between 2000-2800 cm$^{-1}$ represents peak associated with salt formation between dexketoprofen free acid and lidocaine free base;
wherein the associated form on topical administration to a subject provides extended release of the dexketoprofen free acid and the lidocaine free base;
wherein the associated form or the solution composition does not include any excipient to extend the release of the dexketoprofen free acid and the lidocaine free base; and
wherein the solution on topical administration to a subject provides a mean Tmax range for dexketoprofen of from about 17 hours to about 37 hours.

9. The solution composition of claim 8, wherein the vehicle is a monovalent alcohol selected from the group consisting of ethanol, propanol, isopropanol, decyl alcohol, and mixtures thereof.

10. The solution composition of claim 8, wherein the vehicle is a divalent alcohol selected from the group consisting of propylene glycol, butylene glycol, dipropylene glycol, hexylene glycol, polyethylene glycol and mixtures thereof.

11. The solution composition of claim 8, wherein the vehicle is a trivalent alcohol selected from the group consisting of glycerin, hexanetriol, and mixtures thereof.

12. The solution composition of claim 8, wherein the dexketoprofen free acid includes dexketoprofen in free acid form and does not include dexketoprofen salt; and the lidocaine free base includes lidocaine in free base form and does not include lidocaine salt.

13. The solution composition of claim 8, wherein the solution further includes lidocaine free base in addition to the associated form containing dexketoprofen free acid and lidocaine free base in 1:1 weight ratio.

14. The solution composition of claim 8, wherein the solution is dispensed as a topical spray, roll-on, drops, foam, gel, cream or transdermal patch.

15. The solution composition of claim 8, wherein the associated form on topical administration to a subject provides a mean Tmax range for dexketoprofen of from about 17 hours to about 37 hours and provides a mean Tmax range for lidocaine of from about 16 hours to about 26 hours.

16. The solution composition of claim 8, wherein the associated form on topical administration to a subject provides a prolonged plasma level of dexketoprofen of up to about 96 hours and a prolonged plasma level of lidocaine of up to about 72 hours.

17. A method for making a dexketoprofen-lidocaine associated form comprising mixing dexketoprofen free acid and lidocaine free base in 1:1 wt ratio or in 1:1 molar ratio;
wherein
the associated form does not include a covalent bond or an ionic bond between dexketoprofen free acid and lidocaine free base;
wherein the associated form when subjected to characterization using infrared spectrum (IR) is missing IR peak at 1729 cm$^{-1}$ and is missing a broad JR peak between 2000-2800 cm$^{-1}$, wherein the IR peak at 1729 cm$^{-1}$ represents —C═O stretching vibration of acid group in dexketoprofen and the broad peak between 2000-2800 cm$^{-1}$ represent peaks associated with salt formation between dexketoprofen free acid and lidocaine free base;
wherein the associated form provides extended release of dexketoprofen free acid and lidocaine free base;
wherein the associated form on topical administration to a subject provides a Tmax range for dexketoprofen of from about 17 hours to about 37 hours; and
wherein the associated form does not include any excipient to extend the release of the dexketoprofen free acid and the lidocaine free base.

18. The method of claim 17, wherein the associated form is made by triturating or grinding the mixture of the dexketoprofen free acid and the lidocaine free base using pestle and mortar.

19. The method of claim 17, wherein the associated form is made by melting the mixture of dexketoprofen free acid and lidocaine free base into a melt and cooling the mixture into a viscous liquid.

20. The method of claim 17, wherein the associated form is made by dissolving the dexketoprofen free acid and the lidocaine free base in a solvent to obtain a solution, followed by evaporating the solvent from the solution; wherein the solvent is selected from the group consisting of methanol, ethanol, isopropyl alcohol, acetone, acetonitrile, dichloromethane, and mixtures thereof.

21. The method of claim 17, wherein the associated form is made in situ by dissolving the dexketoprofen free acid and the lidocaine free base in a solvent vehicle selected from the group consisting of ethanol, isopropanol, and mixtures thereof.

22. A method for treating a patient suffering from pain associated with arthritis comprising topical administration of a solution composition comprising a dexketoprofen-lidocaine associated form; and a vehicle selected from the group consisting of a monovalent alcohol, a divalent alcohol, a trivalent alcohol, dimethyl sulfoxide, triacetin, propylene carbonate, and mixtures thereof;
the associated form contains dexketoprofen free acid and lidocaine free base; and wherein the associated form does not include a covalent bond or an ionic bond between the dexketoprofen free acid and the lidocaine free base;

wherein the associated form when subjected to characterization using infrared spectrum (IR) is missing IR peak at 1729 cm$^{-1}$ and is missing a broad IR peak between 2000-2800 cm,% wherein the IR peak at 1729 cm represents —C=O stretching vibration of acid group in dexketoprofen and the broad peak between 2000-2800 cm$^{-1}$ represent peak associated with salt formation between dexketoprofen free acid and lidocaine free base;

wherein the solution composition on topical administration to a subject provides extended release of the dexketoprofen free acid and the lidocaine free base;

wherein the associated form on topical administration to a subject provides a Tmax range for dexketoprofen of from about 17 hours to about 37 hours; and wherein the solution composition or the associated form does not include any excipient to extend the release of the dexketoprofen free acid and the lidocaine free base.

23. The method of claim 22, wherein the arthritis is osteoarthritis.

24. The method of claim 22, wherein the arthritis is rheumatoid arthritis.

25. The method of claim 22, wherein the associated form on topical administration to a subject provides a mean Tmax range for dexketoprofen of from about 17 hours to about 37 hours and provides a mean Tmax range for lidocaine of from about 16 hours to about 26 hours.

26. The method of claim 22, wherein the associated form on topical administration to a subject provides prolonged plasma level of dexketoprofen of up to about hours and a prolonged plasma level of lidocaine of up to about 72 hours.

* * * * *